United States Patent
Sugano et al.

(10) Patent No.: US 12,493,146 B2
(45) Date of Patent: Dec. 9, 2025

(54) IMAGING PROCESSING SYSTEM AND 3D MODEL GENERATION METHOD

(71) Applicant: Sony Group Corporation, Tokyo (JP)

(72) Inventors: Hisako Sugano, Kanagawa (JP); Hisayuki Tateno, Kanagawa (JP); Yoichi Hirota, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 428 days.

(21) Appl. No.: 18/015,434

(22) PCT Filed: Jul. 2, 2021

(86) PCT No.: PCT/JP2021/025089
§ 371 (c)(1),
(2) Date: Jan. 10, 2023

(87) PCT Pub. No.: WO2022/014370
PCT Pub. Date: Jan. 20, 2022

(65) Prior Publication Data
US 2023/0288622 A1    Sep. 14, 2023

(30) Foreign Application Priority Data

Jul. 17, 2020    (JP) .................................. 2020-123187

(51) Int. Cl.
*G02B 5/30*    (2006.01)
*G06T 17/00*    (2006.01)
(Continued)

(52) U.S. Cl.
CPC ............ *G02B 5/3025* (2013.01); *G06T 17/00* (2013.01); *G06V 10/141* (2022.01); *G06V 10/54* (2022.01); *H04N 23/90* (2023.01)

(58) Field of Classification Search
CPC .... G02B 5/3025; G06T 17/00; G06V 10/141; G06V 10/54; H04N 23/90; H04N 23/56; G01B 11/245
See application file for complete search history.

(56) References Cited

U.S. PATENT DOCUMENTS

| 2013/0135453 | A1* | 5/2013 | Kanamori | G02B 5/3025 348/65 |
| 2014/0168382 | A1* | 6/2014 | Jang | G01B 11/2509 348/46 |

(Continued)

FOREIGN PATENT DOCUMENTS

| CN | 110493589 A | 11/2019 |
| CN | 110832843 A | 2/2020 |

(Continued)

*Primary Examiner* — Timothy R Newlin
(74) *Attorney, Agent, or Firm* — Paratus Law Group, PLLC

(57) ABSTRACT

There is provided an imaging processing system and a three-dimensional (3D) model generation method capable of generating a more accurate 3D model. The imaging processing system generates the 3D model of an object by using a plurality of captured images obtained by imaging the object, and includes a plurality of polarization illumination devices that includes a polarizer and irradiates the object with polarized light obtained by transmitting light emitted from a light emitting unit through the polarizer from positions different from each other, and a plurality of polarization imaging devices that includes a polarizer and generates the captured images by using polarized light obtained by transmitting light from outside through the polarizer at positions different from each other where the object and at least one of the polarization illumination devices are within an angle of view, in which a polarization direction of the (Continued)

polarizer of the polarization imaging device is different from a polarization direction of the polarizer of the polarization illumination device.

20 Claims, 15 Drawing Sheets

(51) Int. Cl.
*G06V 10/141* (2022.01)
*G06V 10/54* (2022.01)
*H04N 23/90* (2023.01)

(56) References Cited

U.S. PATENT DOCUMENTS

| | | | | |
|---|---|---|---|---|
| 2014/0300721 | A1* | 10/2014 | Imamura | A61B 5/004 |
| | | | | 348/77 |
| 2016/0261850 | A1* | 9/2016 | Debevec | G06V 40/16 |
| 2017/0091548 | A1* | 3/2017 | Agrawal | G06V 10/141 |
| 2017/0091568 | A1* | 3/2017 | Hama | G06T 7/60 |
| 2017/0248796 | A1* | 8/2017 | Banks | G01S 17/894 |
| 2018/0255292 | A1* | 9/2018 | Otto | H04N 13/25 |
| 2018/0338129 | A1* | 11/2018 | Hejl | H04N 23/90 |
| 2019/0052792 | A1* | 2/2019 | Baba | H04N 13/327 |
| 2019/0063917 | A1* | 2/2019 | Hart | G01D 11/30 |
| 2019/0109984 | A1* | 4/2019 | Good | H04N 23/74 |
| 2019/0116355 | A1* | 4/2019 | Schmidt | G01S 17/10 |
| 2019/0174077 | A1* | 6/2019 | Mitani | H04N 23/698 |
| 2019/0266398 | A1* | 8/2019 | Kanamori | G02F 1/0105 |
| 2019/0298252 | A1* | 10/2019 | Patwardhan | A61B 5/0082 |
| 2020/0311892 | A1* | 10/2020 | Pasula | G06V 40/16 |
| 2021/0299879 | A1* | 9/2021 | Pinter | B25J 9/1697 |
| 2021/0338147 | A1* | 11/2021 | Blondek | A61B 5/0077 |
| 2022/0214219 | A1* | 7/2022 | Faraon | G01J 3/0229 |

FOREIGN PATENT DOCUMENTS

| | | |
|---|---|---|
| CN | 111357013 A | 6/2020 |
| JP | H05-312519 A | 11/1993 |
| JP | 2016-020891 A | 2/2016 |
| JP | 2017-058383 A | 3/2017 |
| WO | WO 2018/150933 A1 | 8/2018 |

* cited by examiner

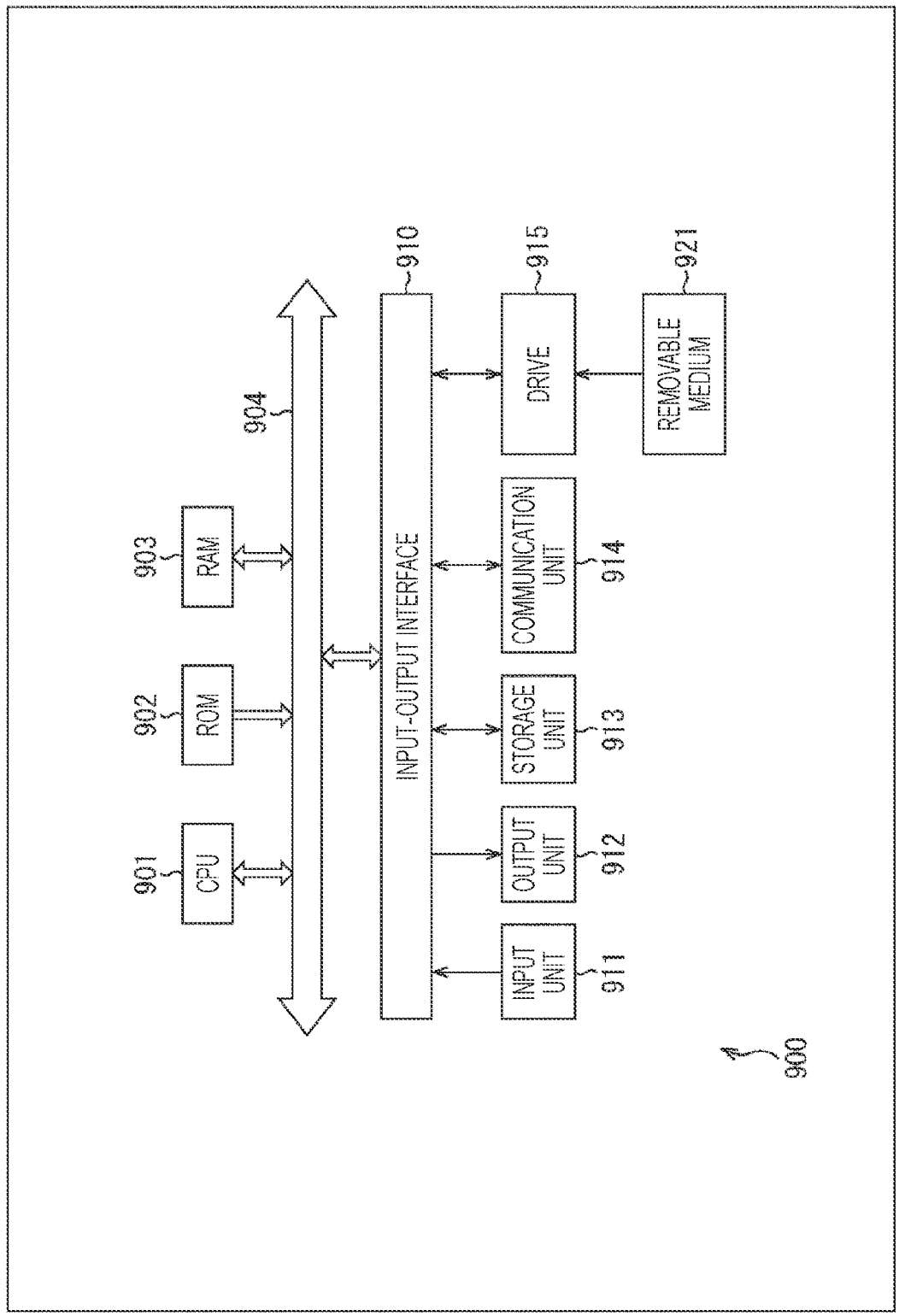

IMAGING PROCESSING SYSTEM AND 3D MODEL GENERATION METHOD

CROSS REFERENCE TO PRIOR APPLICATION

This application is a National Stage Patent Application of PCT International Patent Application No. PCT/JP2021/025089 (filed on Jul. 2, 2021) under 35 U.S.C. § 371, which claims priority to Japanese Patent Application No. 2020-123187 (filed on Jul. 17, 2020), which are all hereby incorporated by reference in their entirety.

TECHNICAL FIELD

The present disclosure relates to an imaging processing system and a 3D model generation method, and more particularly to an imaging processing system and a 3D model generation method capable of generating a more accurate 3D model.

BACKGROUND ART

There is a technology in which a three-dimensional model (3D model) that is a model having three-dimensional information of a subject is generated from a moving image captured from multiple viewpoints, and a free viewpoint moving image that is a moving image according to an arbitrary viewpoint position is generated on the basis of the 3D model. Such a technology is also called a volumetric capture technology or the like.

For example, there has been proposed a technology of generating a 3D model using a method such as Visual Hull in which a three-dimensional shape of a subject is cut out on the basis of a plurality of captured images obtained by imaging from different directions (see, for example, Patent Document 1).

In imaging of a subject in such a volumetric capture technology, light is generally emitted to the subject and the periphery of the subject using an illumination device in order to secure luminance.

CITATION LIST

Patent Document

Patent Document 1: WO 2018/150933

SUMMARY OF THE INVENTION

Problems to be Solved by the Invention

However, in a case of the volumetric capture technology, in order to capture an image of the subject from more various directions, imaging is performed by a plurality of imaging devices arranges so as to surround the subject, and thus there are few blind spots and the illumination device easily fits within the angle of view. When the high-luminance illumination device is included within the angle of view, optical phenomena such as what is called flare, ghost, halation, and the like are likely to occur. When such an optical phenomenon occurs, accuracy of the 3D model generated from the captured image may be reduced.

The present disclosure has been made in view of such a situation, and an object thereof is to generate a more accurate 3D model.

Solutions to Problems

An imaging processing system according to one aspect of the present technology is an imaging processing system that generates a three-dimensional (3D) model of an object by using a plurality of captured images obtained by imaging the object, the imaging processing system including a plurality of polarization illumination devices that includes a polarizer and irradiates the object with polarized light obtained by transmitting light emitted from a light emitting unit through the polarizer from positions different from each other, and a plurality of polarization imaging devices that includes a polarizer and generates the captured images by using polarized light obtained by transmitting light from outside through the polarizer at positions different from each other where the object and at least one of the polarization illumination devices are within an angle of view, in which a polarization direction of the polarizer of the polarization imaging device is different from a polarization direction of the polarizer of the polarization illumination device.

A three-dimensional (3D) model generation method according to another aspect of the present technology is a 3D model generation method including generating a captured image of an object by using polarized light in a polarization direction different from a polarization direction of polarized light emitted from a polarization illumination device within an angle of view at positions different from each other, and generating a 3D model of the object by using a plurality of the captured images obtained at the positions different from each other.

An imaging processing system according to still another aspect of the present technology is an imaging processing system including a plurality of polarization illumination devices that includes a polarizer and irradiates an object with polarized light obtained by transmitting light emitted from a light emitting unit through the polarizer from positions different from each other, and a plurality of polarization imaging devices that includes a polarizer and generates a captured image of the object by using polarized light obtained by transmitting light from outside through the polarizer at positions different from each other where the object and at least one of the polarization illumination devices are within an angle of view, in which a polarization direction of the polarizer of the polarization imaging device is different from a polarization direction of the polarizer of the polarization illumination device.

In the imaging processing system that generates a 3D model of an object by using a plurality of captured images obtained by imaging the object according to the one aspect of the present technology, the object is irradiated with polarized light obtained by transmitting light emitted from a light emitting unit through a polarizer from positions different from each other by a plurality of polarization illumination devices that includes the polarizer, and polarized light obtained by transmitting light from the outside through a polarizer is used to generate the captured images by a plurality of polarization imaging devices that includes the polarizer having a polarization direction different from that of the polarizer of the polarization illumination device at positions different from each other where the object and at least one of the polarization illumination devices are within an angle of view.

In the 3D model generation method according to the another aspect of the present technology, a captured image of an object is generated by using polarized light in a polarization direction different from a polarization direction of polarized light emitted from a polarization illumination device within an angle of view at positions different from each other, and a 3D model of the object is generated by using a plurality of the captured images obtained at the positions different from each other.

The imaging processing system according to the still another aspect of the present technology includes a plurality of polarization illumination devices that includes a polarizer and irradiates an object with polarized light obtained by transmitting light emitted from a light emitting unit through the polarizer from positions different from each other, and a plurality of polarization imaging devices that includes a polarizer whose polarization direction is different from that of the polarizer of the polarized illumination device and generates a captured image or the object by using polarized light obtained by transmitting light from the outside through the polarizer at positions different from each other where the object and at least one of the polarization illumination devices are within an angle of view.

BRIEF DESCRIPTION OF DRAWINGS

FIG. 15 is a block diagram illustrating a main configuration example of a computer.

MODE FOR CARRYING OUT THE INVENTION

Hereinafter, modes for carrying out the present disclosure (hereinafter referred to as embodiments) will be described. Note that the description will be made in the following order.
1. First embodiment (information processing system)
2. Second embodiment (calibration)
3. Application Example
4. Appendix

1. FIRST EMBODIMENT

<Information Processing System>
There is a volumetric capture technology in which a three-dimensional model (3D model) that is a model having three-dimensional information of a subject is generated from a moving image captured from multiple viewpoints, and a free viewpoint moving image that is a moving image according to an arbitrary viewpoint position is generated on the basis of the 3D model. An information processing system 100 in FIG. 1 is a system that images a subject in multiple viewpoints by such a volumetric capture technology, generates a 3D model of the subject from the captured image, and generates a free viewpoint image according to an arbitrary viewpoint position on a the basis of the 3D model.

Figure 1:
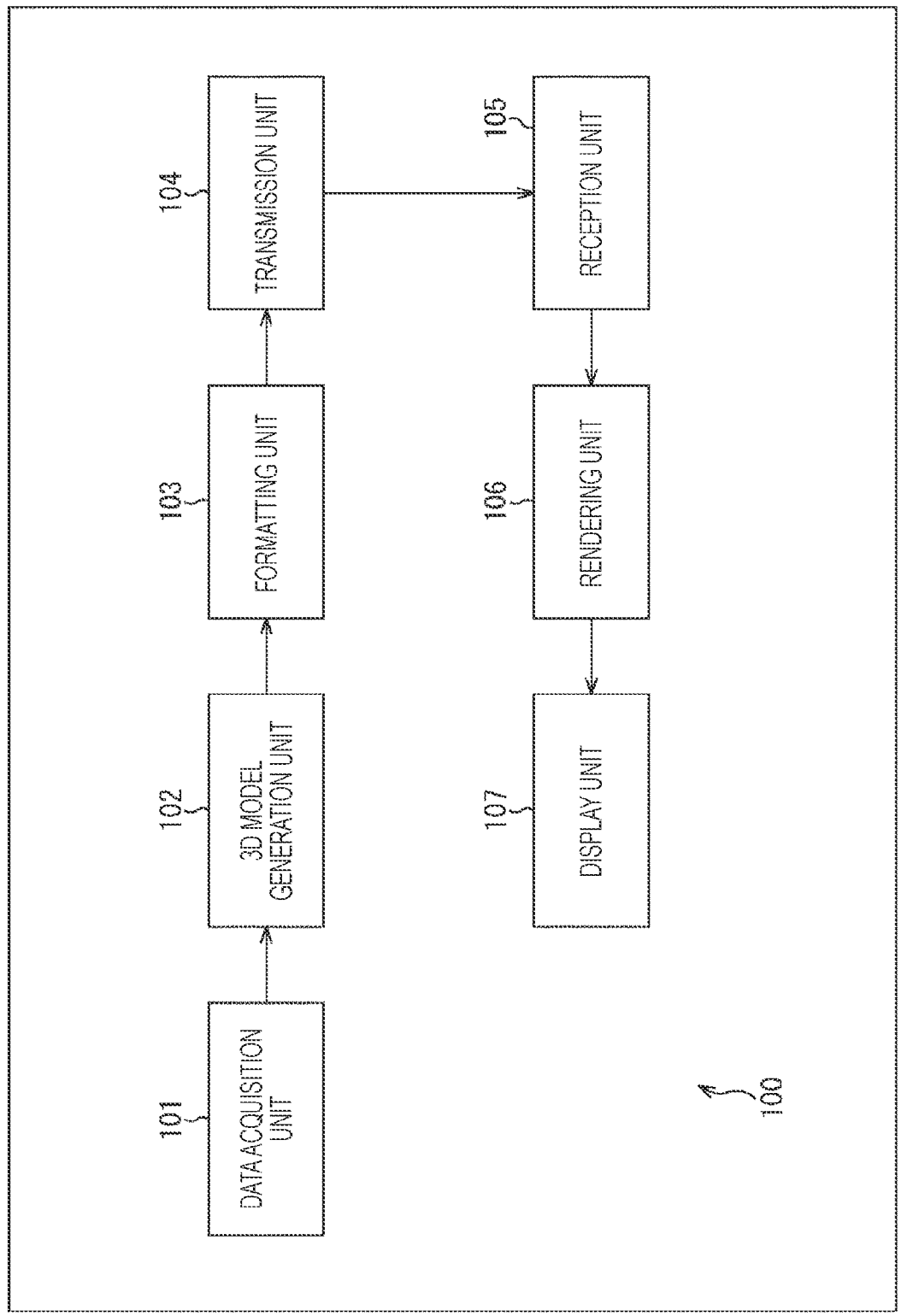
FIG. 1 is a block diagram illustrating a main configuration example of an information processing system.

As illustrated in FIG. 1, the information processing system 100 includes a data acquisition unit 101, a 3D model generation unit 102, a formatting unit 103, a transmission unit 104, a reception unit 105, a rendering unit 106, and a display unit 107.

The data acquisition unit 101 acquires image data for generating a 3D model of the subject. For example, the data acquisition unit 101 acquires, as image data, a plurality of viewpoint images captured by a plurality of imaging devices arranged to surround the subject. In this case, preferably, the plurality of viewpoint images is images obtained by the plurality of imaging devices performing imaging in synchronization.

Note that the data acquisition unit 101 may perform calibration on the basis of the image data and acquire internal parameters and external parameters of each imaging device. Furthermore, the data acquisition unit 101 may acquire, for example, a plurality of pieces of depth information indicating distances from viewpoints at multiple positions to the subject.

The data acquisition unit 101 supplies the acquired image data to the 3D model generation unit 102.

The 3D model generation unit 102 generates a 3D model, which is a model having three-dimensional information of the subject, on the basis of the image data supplied from the data acquisition unit 101. The 3D model generation unit 102 generates the 3D model of the subject by, for example, scraping the three-dimensional shape of the subject using images from a plurality of viewpoints (for example, silhouette images from the plurality of viewpoints) using what is called a visual hull.

Here, the silhouette image is an image representing only an outline (outer shape) of the subject, and a region inside the outline is represented by being with a single color like a shadow picture, for example. That is, the 3D model generation unit 102 generates such a silhouette image from the image data (captured image) supplied from the data acquisition unit 101. Note that the image data of the silhouette image may be supplied from the data acquisition unit 101 to the 3D model generation unit 102.

The 3D model generation unit 102 can further deform the 3D model generated using the visual hull with high accuracy using the plurality of pieces of the depth information indicating distances from viewpoints at multiple positions to the subject.

The 3D model generated by the 3D model generation unit can also be referred to as a moving image of the 3D model by generating the 3D model in time series frame units. Furthermore, since the 3D model is generated using images captured by the imaging devices of the data acquisition unit 101, the 3D model can also be said as a 3D model of a real picture. The 3D model can represent shape information representing a surface shape of the subject in the form of, for example, mesh data representing the 3D model by connection of vertices, which is called a polygon mesh. The method of representing the 3D model is not limited thereto, and the 3D model may be described by what is called a point cloud representation method that represents the 3D model by position information of points.

Data of color information is also generated as a texture in association with the 3D shape data. For example, there are a case of a view independent texture in which colors are constant when viewed from any direction and a case of a view dependent texture in which colors change depending on a viewing direction.

The 3D model generation unit 102 supplies data of the generated 3D model to the formatting unit 103.

The formatting unit 103 converts the 3D model data supplied from the 3D model generation unit 102 into a format suitable for transmission and accumulation. For example, the formatting unit 103 may convert the 3D model generated by the 3D model generation unit 102 into a plurality of two-dimensional images by performing perspective projection from a plurality of directions. Moreover, the formatting unit 103 may generate depth information, which is a two-dimensional depth image from a plurality of viewpoints, using the 3D model. In this case, the formatting unit 103 may encode (compress) the depth information and the color information in a state of this two-dimensional image. In this case, the formatting unit 103 may encode the depth information and the color information side by side as one image or as two separate images. Furthermore, since the depth information and the color information are in the form of two-dimensional image data, the formatting unit 103 may encode (compress) the depth information and the color information using a two-dimensional compression technique such as advanced video coding (AVC).

In the above case, the formatting unit 103 supplies the 3D model data to the transmission unit 104 as transmission data including 2D data (or coded data thereof).

Furthermore, for example, the formatting unit 103 may convert the 3D data of the mesh data into a point cloud format and supply the data to the transmission unit 104 as transmission data including the 3D data. In this case, the formatting unit 103 may encode (compress) the 3D data using, for example, a three-dimensional compression technology of Geometry-based Approach discussed in MPEG.

The transmission unit 104 transmits the transmission data formed by the formatting unit 103 to the reception unit 105. The transmission unit 104 performs a series of processing of the data acquisition unit 101, the 3D model generation unit 102, and the formatting unit 103 offline, and then transmits the transmission data to the reception unit 105. Furthermore, the transmission unit 104 may transmit the transmission data generated from the series of processes described above to the reception unit 105 in real time.

The reception unit 105 receives the transmission data transmitted from the transmission unit 104 and supplies the transmission data to the rendering unit 106.

The rendering unit 106 performs rendering using the transmission data received by the reception unit 105. For example, the rendering unit 106 projects a mesh of a 3D model from a viewpoint of a camera that draws the mesh of the 3D model, and performs texture mapping to paste a texture representing a color or a pattern. The drawing at this time can be arbitrarily set and viewed from a free viewpoint regardless of the camera position at the time of imaging.

For example, the rendering unit 106 performs texture mapping to paste a texture representing the color, pattern, or texture of the mesh according to the position of the mesh of the 3D model. The texture mapping includes what is called a view dependent method in which the viewing viewpoint of the user is considered and a view independent method in which the viewing viewpoint of the user is not considered. Since the view dependent method changes the texture to be pasted on the 3D model according to the position of the viewing viewpoint, there is an advantage that rendering of higher quality can be achieved than by the View Independent method. On the other hand, the view independent method does not consider the position of the viewing viewpoint, and thus there is an advantage that the processing amount is reduced as compared with the view dependent method. Note that data of the viewing viewpoint is input from the display unit 107 to the rendering unit 106 after the display unit 107 detects a viewing point (region of interest) of the user. Furthermore, the rendering unit 106 may employ, for example, billboard rendering for rendering an object so that the object maintains a vertical posture with respect to the viewing viewpoint. For example, when rendering a plurality of objects, the rendering unit 106 can render objects of low interest to the viewer by billboard and render other objects by another rendering method.

The rendering unit 106 supplies data of rendering result to the display unit 107.

The display unit 107 displays a result of rendering by the rendering unit 106 on the display unit of a display device. The display device may be, for example, a 2D monitor or a 3D monitor, such as a head mounted display, a spatial display, a mobile phone, a television, or a personal computer (PC).

<Flow of System Processing>

Figure 2:
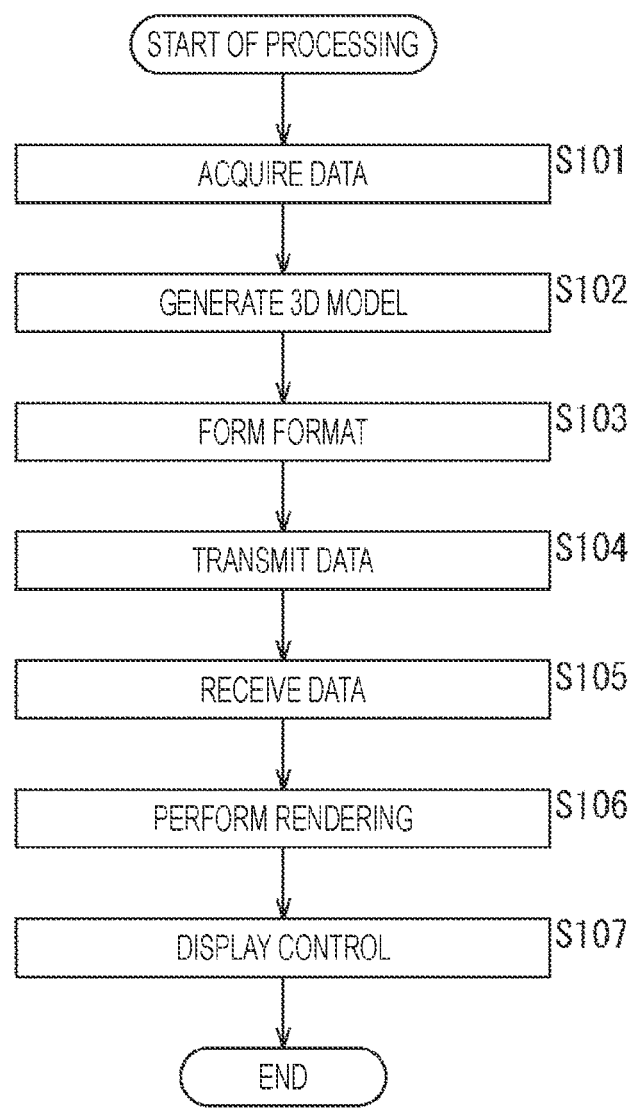
FIG. 2 is a flowchart describing an example of a flow of system processing.

An example of a flow of system processing executed by the information processing system 100 will be described with reference to a flowchart of FIG. 2.

When the processing is started, in step S101, the data acquisition unit 101 acquires image data for generating the 3D model of the subject.

In step S102, the 3D model generation unit 102 generates a 3D model that is a model having three-dimensional information of the subject on the basis of the image data acquired in step S101.

In step S103, the formatting unit 103 encodes the shape and texture data of the 3D model generated in step S102 into a format suitable for transmission and accumulation.

In step S104, the transmission unit 104 transmits encoded data generated in step S103.

In step S105, the reception unit 105 receives the data transmitted in step S104.

In step S106, the rendering unit 106 performs a decoding process and converts the data into data of a shape and a texture necessary for display. Furthermore, the rendering unit 106 performs rendering using the data of the shape and texture.

In step S107, the display unit 107 displays the rendering result.

When the processing of step S107 ends, the system processing ends.

By performing each processing as described above, the information processing system 100 can generate a 3D model of the subject and generate and display an image of the subject viewed from a free viewpoint. Thus, the user who is the viewer can view the subject from the free viewpoint.

Modification Example

In the above, the information processing system 100 has described a series of flow from the data acquisition unit 101 that acquires the captured image, which is a material for generating content, to the display unit 107 that displays the image viewed by the user. However, it is not meant that all functional blocks are required for implementation of the present invention, the present invention may be implemented for each functional block or a combination of a plurality of functional blocks. For example, in FIG. 1, the transmission unit 104 and the reception unit 105 are provided in order to illustrate a series of flow from a side of creating content to a side of viewing the content through distribution of content data, but the process from creation to viewing of the content can also be performed by the same information processing device (for example, a personal computer). In that case, the formatting unit 103, the transmission unit 104, and the reception unit 105 can be omitted.

Furthermore, in a case where the information processing system 100 is implemented, the same implementer can implement all of the functional blocks, or different implementers can implement the functional blocks. For example, a business operator A may implement the data acquisition unit 101, the 3D model generation unit 102, and the formatting unit 103 to generate 3D content, a business operator B may implement the transmission unit 104 (platform) to distribute the 3D content, and a business operator C may implement the reception unit 105, the rendering unit 106, and the display unit 107 to receive, render, control display, and the like of the 3D content.

Furthermore, each functional block can be implemented on a cloud. For example, the rendering unit 106 may be implemented in the display device or may be implemented in a server. In this case, information is exchanged between the display device and the server.

In FIG. 1, the data acquisition unit 101, the 3D model generation unit 102, the formatting unit 103, the transmission unit 104, the reception unit 105, the rendering unit 106, and the display unit 107 are collectively described as the information processing system 100. However, the configuration of the information processing system 100 is not limited to this example, and is only required to include at least the data acquisition unit 101. For example, in the configuration illustrated in FIG. 1, any one or more of the 3D model generation unit 102 to the display unit 107 may be omitted. Furthermore, the information processing system 100 may have a configuration (functional block) other than the above-described configuration.

Furthermore, each functional block (the data acquisition unit 101 to the display unit 107) described above is achieved by an arbitrary configuration. For example, each functional block may be achieved by one or more devices (apparatuses). Furthermore, a plurality of functional blocks may be achieved by one device (apparatus).

<Data Acquisition Unit>

Figure 3:
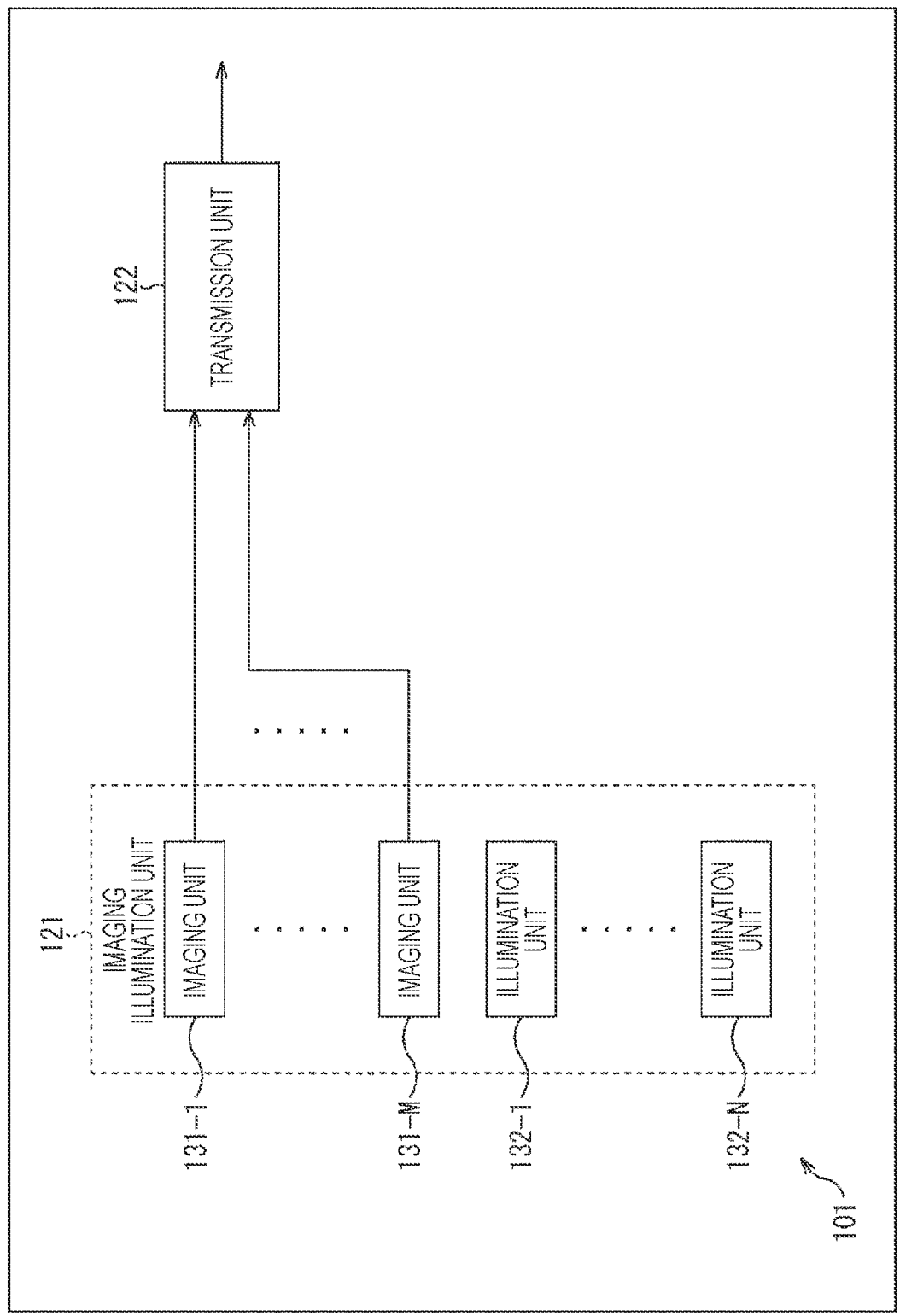
FIG. 3 is a block diagram illustrating a main configuration example of a data acquisition unit.

FIG. 3 is a block diagram illustrating a main configuration example of the data acquisition unit 101 in FIG. 1. The data acquisition unit 101, which is an embodiment of the imaging processing system to which the present technology is applied, includes an imaging illumination unit 121 and a transmission unit 122 as illustrated in FIG. 3.

The imaging illumination unit 121 images a subject and illuminates the subject. The imaging illumination unit 121 includes imaging units 131-1 to 131-M and illumination units 132-1 to 132-N (M and N are integers of 2 or more). The imaging unit 131-1 to the imaging unit 131-M will be referred to as imaging units 131 in a case where it is not necessary to distinguish the imaging units from each other for explanation. The illumination units 132-1 to 132-N will be referred to as illumination units 132 in a case where it is not necessary to distinguish the illumination units from each other for explanation.

That is, the imaging illumination unit 121 includes a plurality of imaging units 131 and a plurality of illumination units 132. Note that the number of the imaging units 131 and the number of the illumination units 132 included in the imaging illumination unit 121 may be the same (that is, M=N) as each other or may be different from each other.

The imaging unit 131 includes one or a plurality of image pickup devices, and images a subject to generate a captured image for 3D model generation. That is, the imaging unit 131 generates a captured image used to extract the silhouette and texture of the subject. The imaging unit 131 supplies data of the generated captured image to the transmission unit 122.

A wavelength band of light received by the image pickup device of the imaging unit 131 is arbitrary, and may be either visible light or invisible light. For example, the imaging unit 131 may receive visible rays (RGB rays) and generate a captured image of visible light, or may receive infrared rays (infrared (IR) rays) and generate a captured image of infrared light.

The illumination unit 132 includes one or a plurality of illumination devices, and illuminates a subject imaged by the imaging unit 131. A wavelength band of light emitted by the illumination device of the illumination unit 132 is arbitrary, and may be either visible light or invisible light. For example, the illumination unit 132 may illuminate the subject with visible rays (RGB rays) or may illuminate the subject with infrared rays (IR rays).

The transmission unit 122 transmits data of the captured image supplied from the imaging unit 131 to the 3D model generation unit 102. At that time, the transmission unit 122 may supply the data of the captured image to the 3D model generation unit 102 without encoding the data, or may encode the data of the captured image and supply coded data to the 3D model generation unit 102. Furthermore, the transmission unit 122 may perform arbitrary image processing on the captured image. For example, the transmission unit 122 may extract a silhouette or texture from the captured image and supply data of the extracted silhouette or texture to the 3D model generation unit 102.

Generally, when the luminance is too low (too dark), it is difficult to image the subject. Thus, by the illumination unit 132 illuminating the subject, the imaging unit 131 can capture an image of the subject with sufficient brightness, and can obtain a captured image in which luminance is sufficiently secured.

However, in a case of the data acquisition unit 101 that acquires the captured image for 3D model generation, the plurality of imaging units 131 is arranged around the subject so as to reduce blind spots. Therefore, there is a very high possibility that the illumination unit 132 is included within the angle of view of the imaging unit 131. In other words, it is difficult to arrange the illumination unit 132 so as not to be included within the angle of view of the imaging unit 131.

Since (the illumination device of) the illumination unit 132 is a light source with high luminance, when the illumination unit 132 is included within the angle of view, a phenomenon such as what is called flare, ghost, halation, and the like, in which the light leaks to a dark portion, is likely to occur. When such a phenomenon occurs, it may be difficult to extract an accurate silhouette of the subject from the captured image. Furthermore, it may also be difficult extract the texture of the subject. Thus, accuracy of the 3D model generated from the captured image may be reduced.

<Application of Polarizer>

Accordingly, a polarizer that generates straight polarized light from natural light (non-polarized light) or circularly polarized light is provided in the imaging unit 131 (image pickup device) and the illumination unit 132 (illumination device), the illumination unit 132 illuminates the subject with polarized light, and the imaging unit 131 receives polarized light to generate a captured image. Then, the polarization direction (that is, the polarization direction of the polarizer included in the illumination unit 132) of the polarized light emitted by the illumination unit 132 and the polarization direction (that is, the polarization direction of the polarizer included in the imaging unit 131) of the polarized light received by the imaging unit 131 are made different from each other.

Note that, in the present description, a beam mainly including a vibration component in a predetermined direction will be referred to as polarized light, and a main vibration direction of the polarized light will be referred to as a polarization direction (or a polarization angle). Furthermore, the polarizer generates polarized light in a predetermined polarization direction, and the polarization direction will also be referred to as a polarization direction (or polarization angle) of the polarizer.

For example, an imaging processing system that generates a 3D model of an object by using a plurality of captured images obtained by imaging the object includes a plurality of polarization illumination devices (for example, the illumination unit 132) that includes a polarizer and irradiates the object with polarized light obtained by transmitting light emitted from a light emitting unit through the polarizer from positions different from each other, and a plurality of polarization imaging devices (for example, the imaging unit 131) that includes a polarizer and generates the captured images by using polarized light obtained by transmitting light from the outside through the polarizer at positions different from each other where the object and at least one of the polarization illumination devices are within an angle of view, in which a polarization direction of the polarizer of the polarization imaging device is different from a polarization direction of the polarizer of the polarization illumination device.

For example, a captured image of an object is generated by using polarized light in a polarization direction different from that of polarized light emitted from a polarization illumination device (for example, the illumination unit 132) within an angle of view at positions different from each other, and a 3D model of the object is generated by using a plurality of captured images obtained at the positions different from each other.

For example, an imaging processing system includes a plurality of polarization illumination devices (for example, the illumination unit 132) that includes a polarizer and irradiates an object with polarized light obtained by transmitting light emitted from a light emitting unit through the polarizer from positions different from each other, and a plurality of polarization imaging devices (for example, the imaging unit 131) that includes a polarizer and generates captured images of the object by using polarized light obtained by transmitting light from the outside through the polarizer at positions different from each other where the object and at least one of the polarization illumination devices are within an angle of view, in which a polarization direction of the polarizer of the polarization imaging device is different from a polarization direction of the polarizer of the polarization illumination device.

When the polarization direction of the polarizer of the imaging unit 131 and the polarization direction of the polarizer of the illumination unit 132 are different from each other, the amount of direct light from the illumination unit 132 that passes through the polarizer of the imaging unit 131 and enters the sensor is reduced. Therefore, in the captured image generated by the imaging unit 131, a luminance value of a portion of the illumination unit 132 that is included within the angle of view can be reduced, and thus the occurrence of what is called flare, ghost, halation, and the like can be suppressed. Accordingly, the silhouette and the texture can be more accurately extracted from the captured image, and thus the 3D model generation unit 102 can generate a more accurate 3D model (reduction in accuracy of the 3D model can be suppressed).

Note that the degree of reduction in the amount of direct light from the illumination unit 132 that is transmitted through the polarizer of the imaging unit 131 and enters the sensor in this manner depends on the relationship (angle) between the polarization direction of the polarizer of the imaging unit 131 and the polarization direction of the polarizer of the illumination unit 132. In General, the closer the angle between them is to 90 degrees, the more the amount of light decreases. That is, as the angle between the polarization direction of the polarizer of the imaging unit 131 and the polarization direction of the polarizer of the illumination unit 132 approaches 90 degrees, the occurrence of what is called flare, ghost, halation, and the like can be more strongly suppressed.

<Illumination Unit>

Figure 4:
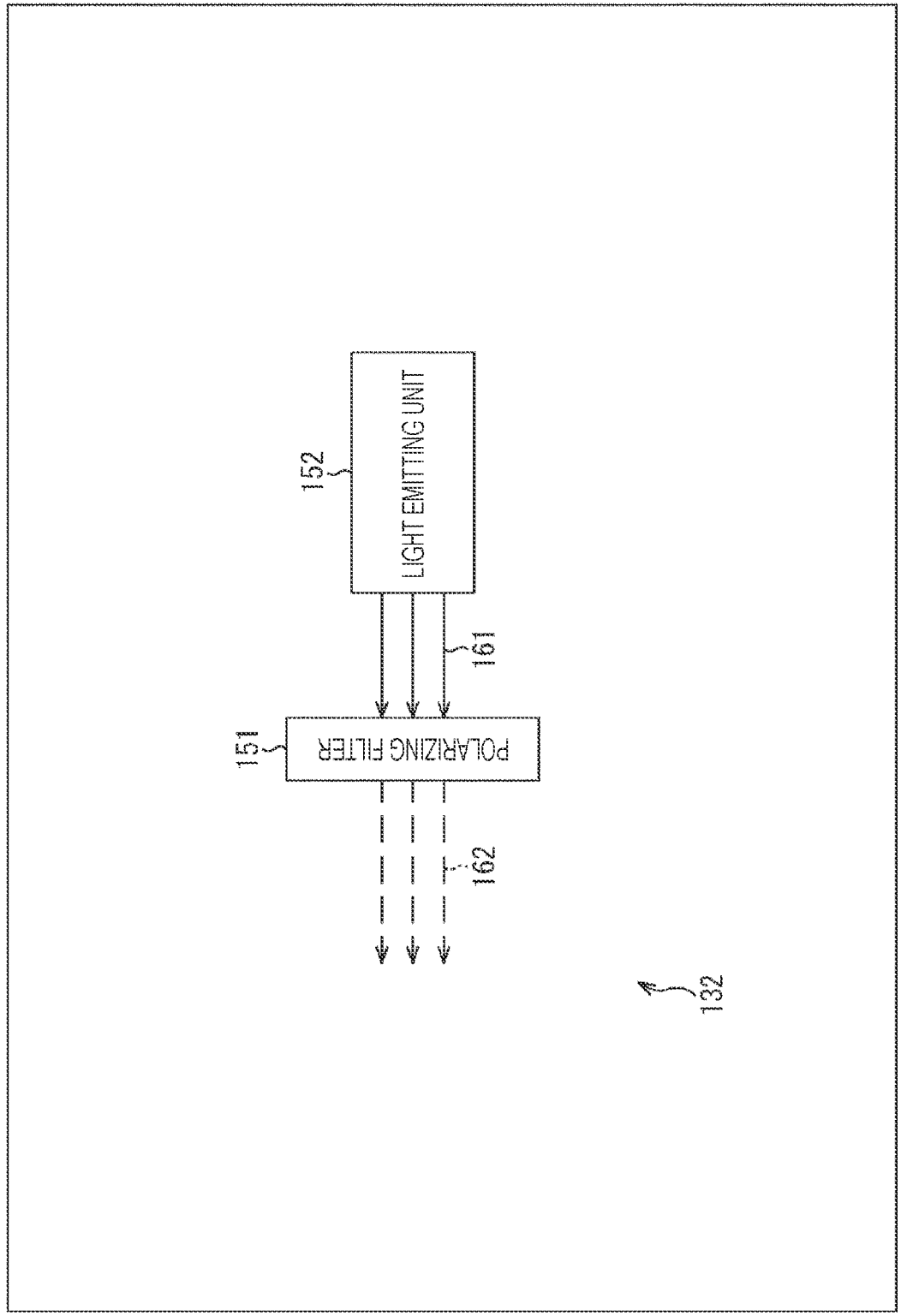
FIG. 4 is a block diagram illustrating a main configuration example of an illumination unit.

FIG. 4 is a block diagram illustrating a main configuration example of the illumination unit 132. As illustrated in FIG. 4, the illumination unit 132 includes a polarizing filter 151 and a light emitting unit 152.

The polarizing filter 151 is an example of a polarizer, and generates polarized light by transmitting light of a component vibrating in a predetermined direction. The light emitting unit 152 is a light source and emits a beam (non-polarized light) having a predetermined wavelength in a predetermined direction.

As illustrated in FIG. 4, the polarizing filter 151 is arranged in front of the light emitting unit 152 in a beam emission direction (irradiation direction.). Non-polarized light 161 emitted from the light emitting unit 152 is directed to the polarizing filter 151. The polarizing filter 151 transmits a vibration component of the non-polarized light 161 in a predetermined direction. That is, polarized light 162 having the predetermined direction as the polarization direction is generated by the polarizing filter 151. This polarized light 162 is emitted from the illumination unit 132. That is, the illumination unit 132 is a polarization illumination device that includes a polarizer and emits polarized light generated by the polarizer using the light from the light source.

The illumination unit 132 is installed at a position and in a posture to illuminate an object to be a subject of the imaging unit 131, and thus at least a part of the polarized light 162 is emitted to the object. Then, at least the part of the emitted polarized light 162 is reflected by the object or the like to become non-polarized light, and travels toward the imaging unit 131. That is, by the illumination unit 132 performing illumination in this manner, luminance of the captured image can be increased.

Note that a wavelength band of the polarized light 162 emitted by the illumination unit 132 is arbitrary. For example, the polarized light 162 may be visible light, invisible light, or both. For example, the polarized light 162 may be infrared rays (IR rays). Furthermore, the illumination unit 132 may include a plurality of light emitting units 152 (light sources) that emits beams in different wavelength regions from each other, and the imaging illumination unit 121 may include a plurality of illumination units 132 that emits polarized light 162 in different wavelength regions from each other.

Furthermore, the polarization direction (that is, the polarization direction of the polarized light 162) of the polarizing filter 151 may be determined in advance (may be fixed) or variable. For example, a polarization direction control mechanism (movable ring or the like) that controls the polarization direction of the polarizing filter 151 may be provided, and the polarization direction of the polarizing filter 151 may be variable by the polarization direction control mechanism.

<Imaging>

Figure 5:
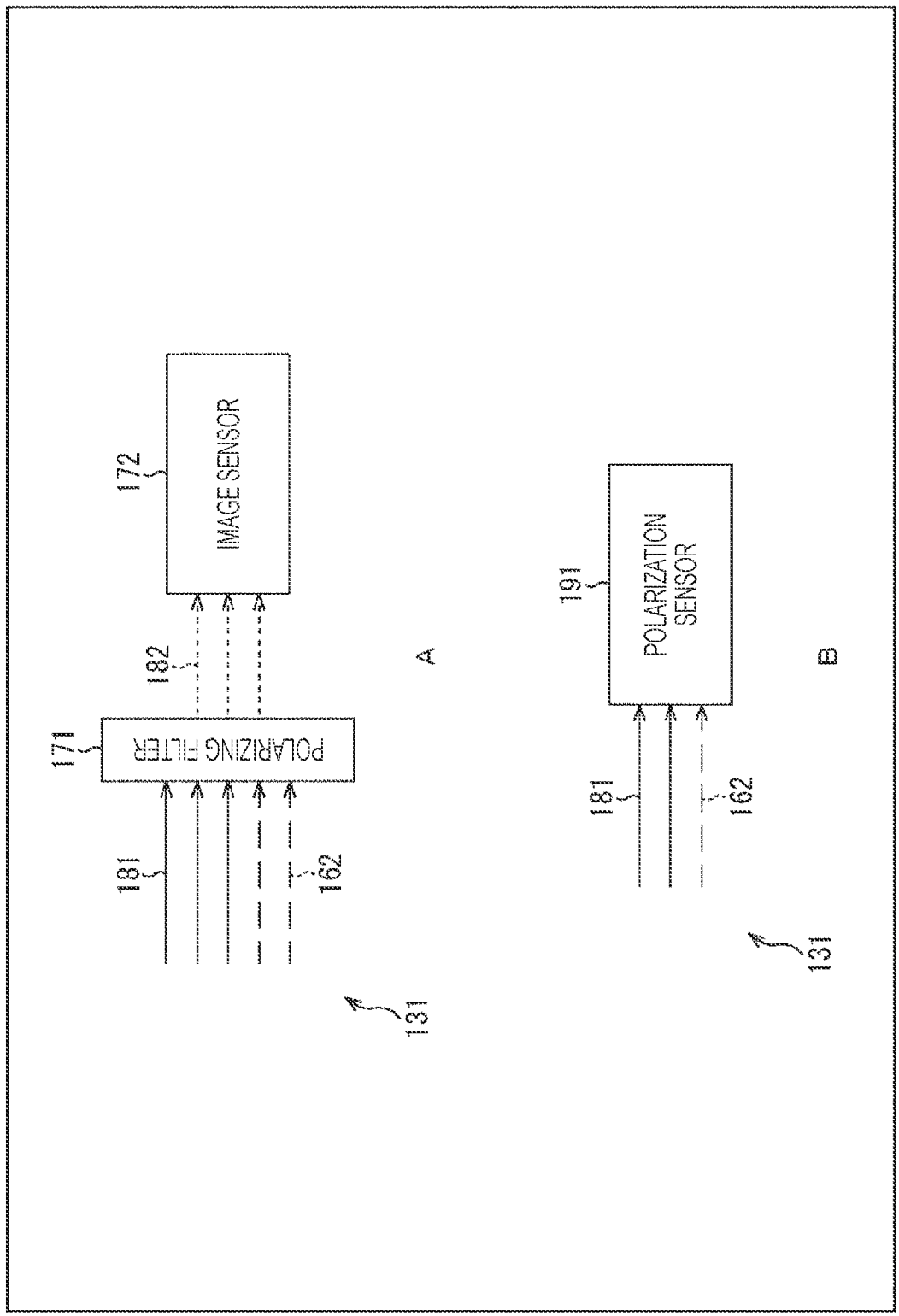
FIG. 5 is a block diagram illustrating a main configuration example of an imaging unit.

FIG. 5 is a block diagram illustrating a main configuration example of the imaging unit 131. For example, as illustrated in A of FIG. 5, the imaging unit 131 includes a polarizing filter 171 and an image sensor 172.

The polarizing filter 171 is an example of a polarizer, and generates polarized light by transmitting light of a component vibrating in a predetermined direction. The image sensor 172 includes a plurality of pixels, photoelectrically converts incident light in each pixel, and generates a captured image. The image sensor 172 supplies data of the generated captured image to the transmission unit 122.

As illustrated in A of FIG. 5, the polarizing filter 171 is arranged on a beam incident side of the image sensor 172. Non-polarized light 181 incident on the imaging unit 131 is directed to the polarizing filter 171. The polarizing filter 171 transmits a vibration component of the non-polarized light 181 in a predetermined direction. That is, polarized light 182 having the predetermined direction as the polarization direction is generated by the polarizing filter 171. The polarized light 182 enters the image sensor 172 and is photoelectrically converted. That is, the image sensor 172 generates a captured image corresponding to the polarized light 182. That is, the imaging unit 131 is a polarization imaging device that includes a polarizer and generates a captured image using polarized light generated by the polarizer.

Note that, in a case where the illumination unit 132 is located within the angle of view of the imaging unit 131, there is a case where direct light from the illumination unit 132 enters the imaging unit 131. That is, the polarized light 162 emitted from the illumination unit 132 may be directed to the polarizing filter 171. Here, the polarization direction of the polarizing filter 171 is set to a direction different from the polarization direction of the polarizing filter 151. That is, the polarizing filter 171 and the polarizing filter 151 have different polarization directions from each other. Thus, at least a part of the polarized light 162 is blocked by the polarizing filter 171. That is, the amount of polarized light 162 incident on the image sensor 172 is reduced.

That is, in the captured image generated by the imaging unit 131, the luminance value of the portion of the illumination unit 132 that is included within the angle of view can be reduced, and thus the occurrence of what is called flare, ghost, halation, and the like can be suppressed. Accordingly, the silhouette and the texture can be more accurately extracted from the captured image, and thus the 3D model generation unit 102 can generate a more accurate 3D model (reduction in the accuracy of the 3D model can be suppressed).

Note that a wavelength band of light received and photoelectrically converted by the image sensor 172 (that is, a wavelength band of the polarized light 182) is arbitrary. For example, the image sensor 172 may photoelectrically convert visible light, may photoelectrically convert invisible light, or may photoelectrically convert both. That is, the imaging unit 131 may generate data of a captured image of visible light, may generate data of a captured image of invisible light, or may generate both the captured images. For example, the image sensor 172 may photoelectrically convert infrared rays (IR rays). That is, the imaging unit 131 may generate a captured image of infrared rays (IR rays). Furthermore, the imaging unit 131 may include a plurality of image sensors 172 that photoelectrically converts beams in different wavelength regions from each other, and the imaging illumination unit 121 may include a plurality of imaging units 131 that generates captured images of beams in different wavelength regions from each other.

The captured image generated by the imaging unit 131 may be used to extract a silhouette of an object that is a subject. In other words, the imaging unit 131 may generate a captured image for extracting the silhouette of the object. By providing a polarizer (for example, the polarizing filter 171) in the imaging unit 131 that generates such a captured image, a silhouette can be more accurately extracted from the captured image.

Furthermore, the captured image generated by the imaging unit 131 may be used to extract a texture of an object that is a subject. In other words, the imaging unit 131 may generate a captured image for extracting the texture of the object. By providing a polarizer (for example, the polarizing filter 171) in the imaging unit 131 that generates such a captured image, the texture can be more accurately extracted from the captured image.

Of course, the captured image generated by the imaging unit 131 may be used to extract both the silhouette and the texture of the object that is the subject. In other words, the imaging unit 131 may generate a captured image for extracting the silhouette and texture of the object. Furthermore, the imaging unit 131 may generate each of the captured image for extracting the silhouette of the object and the captured image for extracting the texture of the object.

Furthermore, the imaging illumination unit 121 may include the imaging unit 131 that generates a captured image used to extract a silhouette of an object, and the imaging unit 131 that generates a captured image used to extract a texture of an object. In that case, the polarizer (for example, the polarizing filter 171) may be provided in the imaging unit 131 that generates a captured image used to extract a silhouette of an object, may be provided in the imaging unit 131 that generates a captured image used to extract a texture of an object, or may be provided in both the imaging units 131.

Furthermore, the polarization direction (that is, a vibration direction of the polarized light 182) of the polarizing filter 171 may be determined in advance (may be fixed) or variable. For example, a polarization direction control mechanism (movable ring or the like) that controls the polarization direction of the polarizing filter 171 may be provided, and the polarization direction of the polarizing filter 171 may be variable by the polarization direction control mechanism.

Furthermore, as illustrated in B of FIG. 5, the imaging unit 131 may include a polarization sensor 191. The polarization sensor 191 is an image sensor that photoelectrically converts polarized light to generate a captured image. The polarization sensor 191 includes a plurality of pixels, each pixel is provided with a polarizer that generates polarized light from incident light, and a light receiving unit provided in each pixel receives the polarized light generated by the polarizer and performs photoelectric conversion. That is, the polarization sensor 191 polarizes and photoelectrically converts the incident non-polarized light 181 to generate a captured image thereof. Note that the polarization direction of the polarizer provided in each pixel of the polarization sensor 191 is designed to be different from the polarization direction of the polarizing filter 151. That is, the polarizer provided in each pixel of the polarization sensor 191 and the polarizing filter 151 have different polarization directions. Thus, since at least a part of the polarized light 162 is blocked by the polarizer, the light amount (luminance in the captured image) of the polarized light 162 to be photoelectrically converted is reduced.

Therefore, as a case of the polarizing filter 171, in the captured image generated by the imaging unit 131 (polarization sensor 191), the luminance value of the portion of the illumination unit 132 that is included within the angle of view can be reduced, and the occurrence of what is called flare, ghost, halation, and the like can be suppressed. Accordingly, the silhouette and the texture can be more accurately extracted from the captured image, and thus the 3D model generation unit 102 can generate a more accurate 3D model (reduction in the accuracy of the 3D model can be suppressed).

Note that the imaging unit 131 and the illumination unit 132 may be configured as a time-of-flight (ToF) sensor. That is, the imaging unit 131 and the illumination unit 132 may be configured as a distance measurement sensor in which the illumination unit 132 illuminates the subject, the imaging unit 131 receives the reflected light, and the distance to the subject is measured on the basis of a light reception timing thereof. In other words, the present technology can also be applied to an optical distance measurement sensor such as a ToF sensor.

<Imaging and Illumination Unit>

The imaging unit 131 and the illumination unit 132 may be arranged at positions close to each other. Moreover, the imaging unit 131 and the illumination unit 132 may be arranged so that a light irradiation direction by the illumination unit 132 and an imaging direction (for example, a direction of the center of an angle of view) of the imaging unit 131 are the same as each other. In other words, each of the illumination units 132 may be located close to any one of the imaging units 131 and may take a posture in which the irradiation direction of polarized light is the same as the imaging direction of the imaging unit 131 in the vicinity thereof. With this configuration, the illumination unit 132 can perform illumination from the front of the object that is the subject as viewed from the imaging unit 131. Therefore, the imaging unit 131 can generate a captured image in which there are few unnecessary shadows and shades on the subject and the subject has sufficient luminance.

Figure 6:
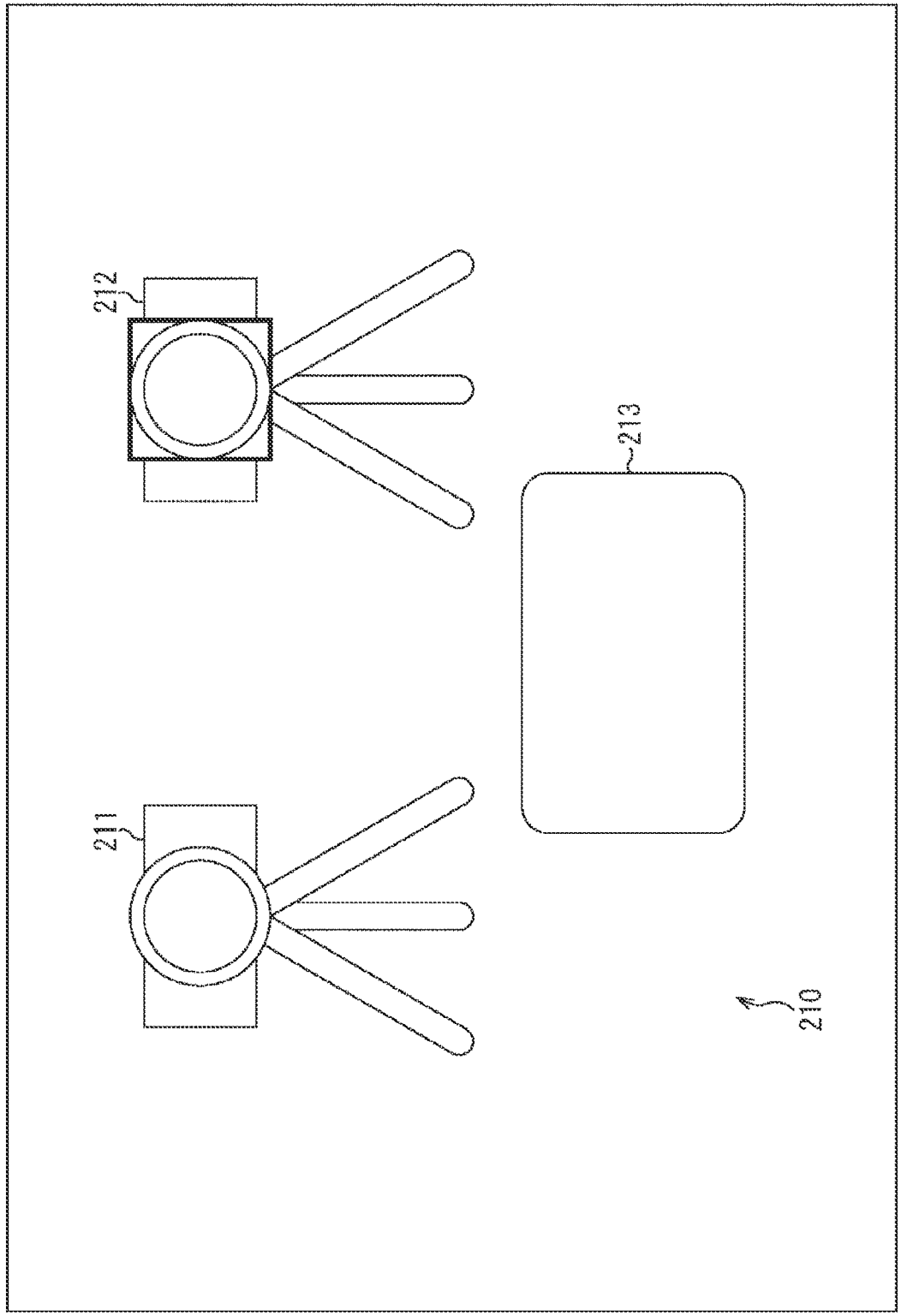
FIG. 6 is a diagram illustrating a configuration example of an imaging and illumination unit.

For example, an imaging and illumination unit may be formed by the imaging unit 131 and the illumination unit 132 arranged close to each other. FIG. 6 is a diagram illustrating an example of the imaging and illumination unit.

In the example of FIG. 6, an imaging and illumination unit 210 includes an RGB camera 211, an IR camera 212, and an IR light 213.

The RGB camera 211 is an imaging unit 131 that receives visible rays and generates a captured image in a wavelength region of visible light. The IR camera 212 is an imaging unit 131 that receives infrared rays and generates a captured image in a wavelength region of infrared light. The IR light 213 is an illumination unit 132 that emits infrared rays.

For example, it is highly possible that the light source of visible light changes drastically outdoors or at a live concert venue. For example, it is conceivable that a subject is irradiated with a spotlight or a lager beam at a live concert venue. In a case where imaging is performed by the imaging processing system as described above under such an environment, a captured image in the wavelength region of visible light is likely to be affected by such illumination, and optical phenomena such as what is called flare, ghost, halation, and the like are likely to occur. Thus, it may be difficult to accurately extract the silhouette of the subject using such a captured image.

Accordingly, the imaging and illumination unit 210 generates a captured image in the wavelength region of infrared light as a captured image for extracting a silhouette of the subject using the IR camera 212. That is, the silhouette of the subject is extracted using the captured image in the wavelength region of infrared light. Then, for imaging by the IR camera 212 (to ensure sufficient luminance in the wavelength region of infrared light), the IR light 213 illuminates the subject using infrared rays.

Note that since the IR camera 212 and the IR light 213 are installed at positions close to each other and facing the same subject as each other, the IR light 213 can be illuminated from the front of the subject as viewed from the IR, camera 212. Therefore, the IR camera 212 can generate a captured image in which there are few unnecessary shadows and shades on the subject and the subject has sufficient luminance. That is, the IR camera 212 can generate a captured image from which a more accurate silhouette can be extracted. In other words, by using the captured image generated by the IR camera 212, the silhouette of the subject can be inure accurately extracted.

Furthermore, the IR camera 212 has a polarizer as in the example of FIG. 5. Similarly, the IR light 213 has a polarizer as in the example of FIG. 4. Then, the polarization direction of the polarizer of the IR camera 212 and the polarization direction of the polarizer of the IR light 213 are different from each other. Therefore, as described above, in the captured image generated by the IR, camera 212, it is possible to suppress the occurrence of what is called flare, ghost, halation, and the like due to infrared light emitted by the IR light 213 that is included within the angle of view. Accordingly, the silhouette can be more accurately extracted from the captured image, and thus the 3D model generation unit 102 can generate a more accurate 3D model (reduction in the accuracy of the 3D model can be suppressed).

Since the RGB camera 211 can generate a captured image in the wavelength region of visible light, it is possible to generate a captured image used to extract the texture of the subject. The RGB camera 211 and the IR camera 212 are installed at positions close to each other toward the same subject as each other. That is, the angles of view of the RGB camera 211 and the IR camera 212 are the same or approximate. Therefore, the texture corresponding to the silhouette of the subject extracted using the captured image generated by the IR camera 212 can be extracted using the captured image generated by the RGB camera 211.

Arrangement Example

Figure 7:
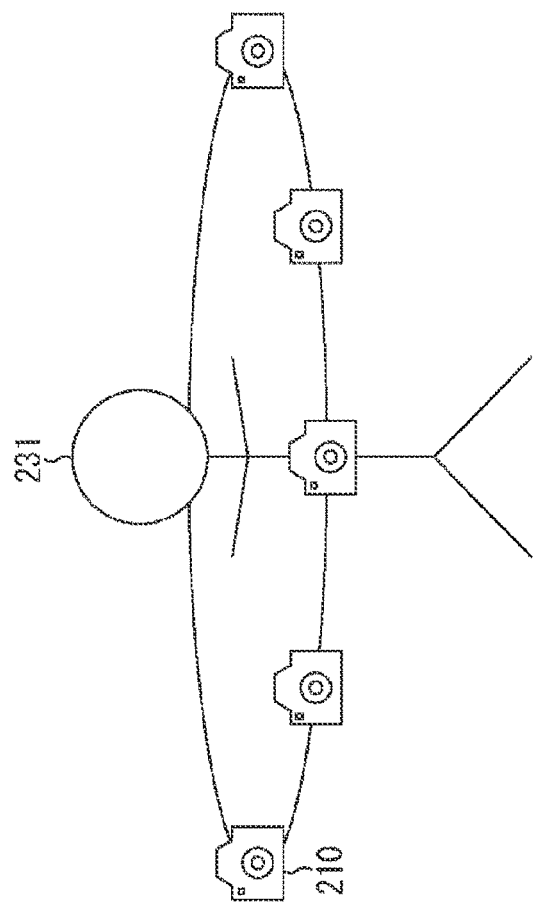
FIG. 7 is a diagram illustrating an arrangement example of the imaging and illumination unit.

An arrangement example of the imaging unit 131 and the illumination unit 132 will be described in units of the imaging and illumination unit 210. As illustrated FIG. 7, the plurality of imaging and illumination units 210 (that is, the imaging unit 131 and the illumination unit 132) may be installed around (so as to surround) an object 231 that is the subject. For example, each imaging and illumination unit 210 may be arranged so that an object to be a subject is positioned in a region (plane or space) having a line connecting adjacent imaging and illumination units 210 with each other as an outer frame.

In that case, the object 231 and at least one of the illumination units 132 may be arranged to be included within the angle of view of each imaging unit 131. Moreover, another imaging unit 131 may be arranged to be included within the angle of view.

Figure 8:
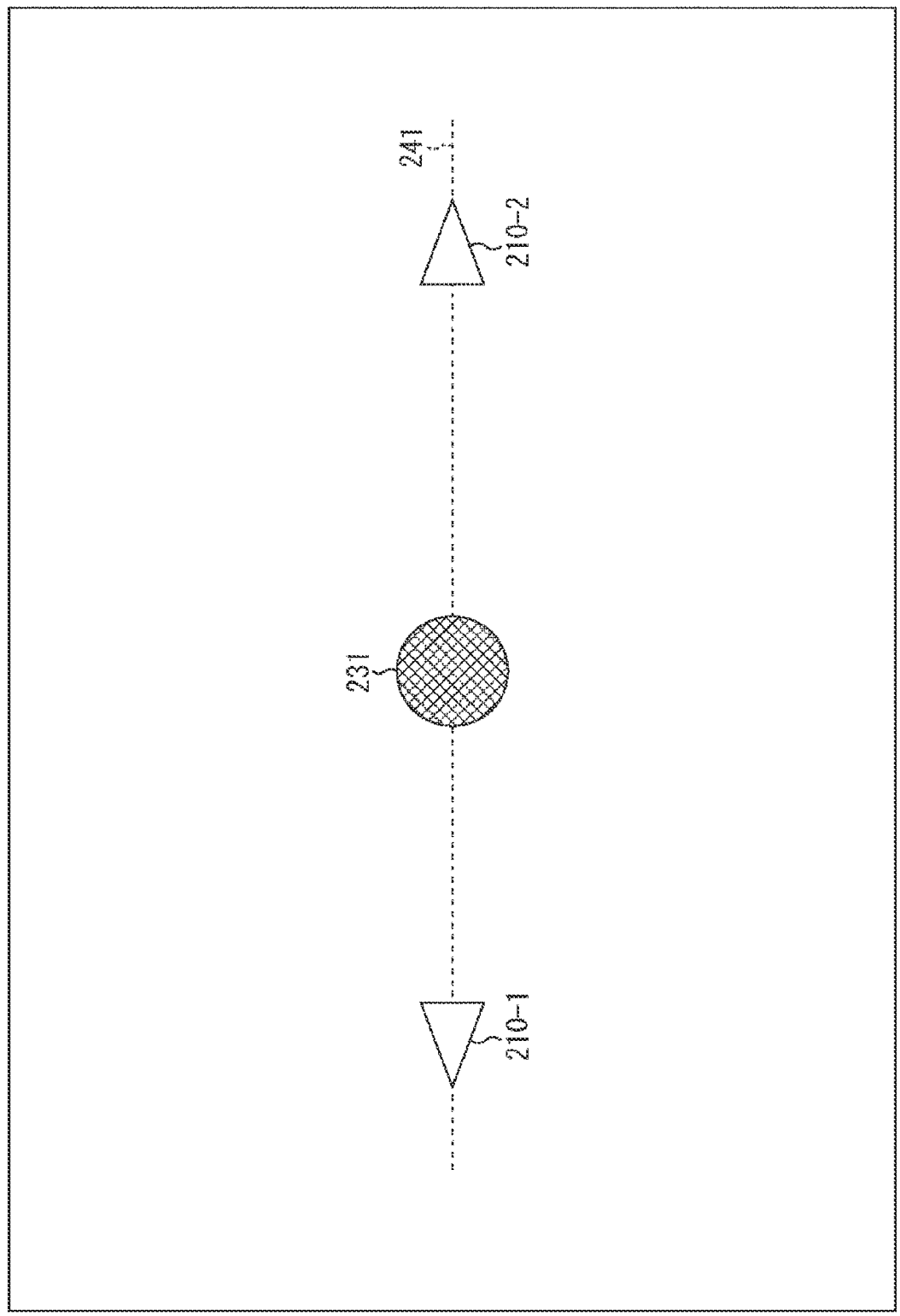
FIG. 8 is a diagram illustrating an arrangement example of the imaging and illumination unit.

For example, as illustrated in FIG. 8, the two imaging and illumination units 210 (imaging and illumination unit 210-1 and imaging and illumination unit 210-2) may be arranged to face each other. In the case of the example of FIG. 8, the imaging and illumination unit 210-1 and the imaging and illumination unit 210-2 are installed on opposite sides of the object 231 on a straight line 241 passing through the object 231 toward the object 231. That is, the imaging direction and the illumination direction of the imaging and illumination unit 210-1 and the imaging and illumination unit 210-2 are opposite to each other.

By installing the two imaging and illumination units 210 (imaging and illumination unit 210-1 and imaging and illumination unit 210-2) in this manner, a wider range of the object 231 can be imaged (the blind spot can be reduced).

In a case of such an arrangement, although the IR light 213 is included within the angle of view of the IR camera 212, as described above, the incidence of direct light from the IR light 213 can be suppressed by using the polarizer, and thus it is possible to suppress the occurrence of what is called flare, ghost, halation, and the like due to infrared light emitted by the IR light 213. Therefore, the silhouette of the object 231 can be more accurately extracted using the captured image generated by the IR camera 212.

Note that the number of imaging and illumination units 210 to be installed is arbitrary as long as it is plural. For example, eight imaging and illumination units 210 may be installed. In a case where a large number of imaging and illumination units 210 are installed as described above, a plurality of other imaging units 131 or illumination units 132 may be included within the angle of view of the imaging unit 131.

That is, the imaging and illumination unit 210 the imaging unit 131 and the illumination unit 132) may be installed so that the plurality of illumination units 132 is included within the angle of view of the imaging unit 131. In that case, the polarization directions of the polarizers of the plurality of illumination units 132 may be the same as each other. With this configuration, it is possible to similarly suppress the incidence of direct light from each of the illumination units 132 to the imaging unit 131 included within the angle of view. That is, it is possible to further suppress the occurrence of what is called flare, ghost, halation, and the like.

Furthermore, the imaging and illumination unit 210 may be installed so that another imaging unit 131 is included within the angle of view of the imaging unit 131. Moreover, the imaging and illumination unit 210 may be installed so that a plurality of other imaging units 131 is included within the angle of view of the imaging unit 131.

Furthermore, the plurality of polarization illumination devices (for example, the illumination unit 132) may include a first polarization illumination device and a second polarization illumination device, the plurality of polarization imaging devices (for example, the imaging unit 131) may include a first polarization imaging device in which the object and the first polarization illumination device are at positions within the angle of view and a second polarization imaging device in which the object and the second polarization illumination device are at positions within the angle of view, the polarization direction of the polarizer of the first polarization imaging device may be different from the polarization direction of the polarizer of the first polarization illumination device, and the polarization direction of the polarizer of the second polarization imaging device may be different from the polarization direction of the polarizer of the second polarization illumination device. That is, there may be a plurality of imaging units 131 in which a single illumination unit 132 is included within the angle of view.

In such a case, the polarization directions of the polarizers of the plurality of illumination units 132 that is included within the angles of view of the imaging units 131 different from each other may be the same or may not be the same as each other. That is, the polarization direction of the polarizer of the second polarization imaging device may be different from the polarization direction of the polarizer of the second polarization illumination device.

That is, the polarization directions of the polarizers of the plurality of illumination units 132 may not be the same as each other. Similarly, the polarization directions of the polarizers of the plurality of imaging units 131 may not be the same as each other. For example, if the polarization direction of the polarizer of one imaging unit 131 among the plurality of imaging units 131 is different from the polarization direction of the polarizer of the illumination unit 132 that is included within the angle of view of the imaging unit 131, the effect of the present embodiment can be obtained.

Figure 9:
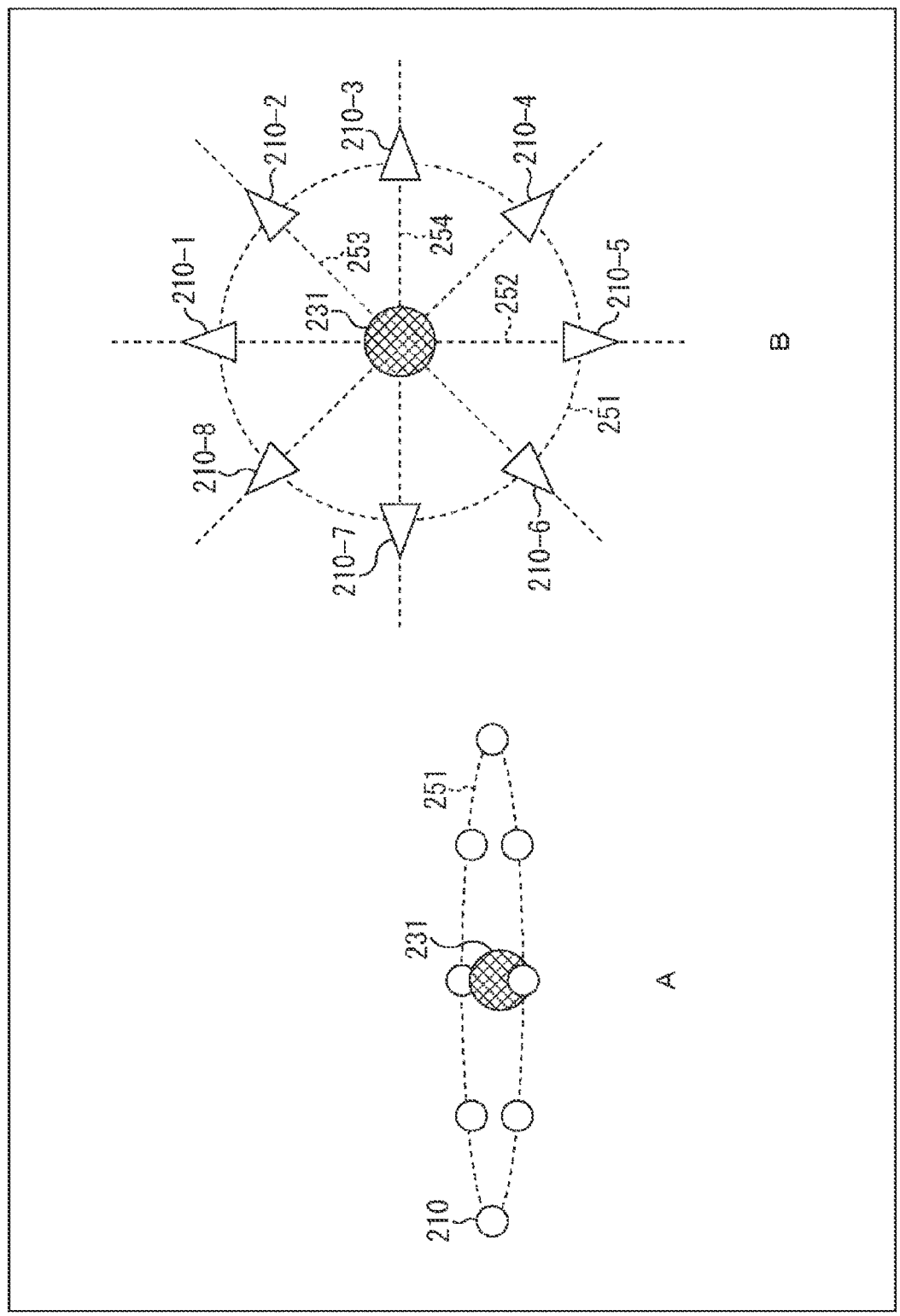
FIG. 9 is a diagram illustrating an arrangement example of the imaging and illumination unit.

For example, as illustrated in A of FIG. 9, the plurality of imaging and illumination units 210 (the imaging units 131 and the illumination units 132) may be arranged in a circular shape centered on the object 231. In the example of A of FIG. 9, eight imaging and illumination units 210 are arranged on a circle 251 centered on the object 231. As illustrated in B of FIG. 9, each of the imaging and illumination units 210 (the imaging and illumination unit 210-1 to the imaging and illumination unit 210-8) is installed toward the object 231. More specifically, the imaging and illumination unit 210-1 and the imaging and illumination unit 210-5 are arranged to face each other on a straight line 252 passing through the object 231. The imaging and illumination unit 210-2 and the imaging and illumination unit 210-6 are arranged to face each other on a straight line 253 passing through the object 231. The imaging and illumination unit 210-3 and the imaging and illumination unit 210-7 are arranged to face each other on a straight line 254 passing through the object 231. The imaging and illumination unit 210-4 and the imaging and illumination unit 210-8 are arranged to face each other on a straight line 255 passing through the object 231.

Even in such a case, the occurrence of what is called flare, ghost, halation, and the like can be suppressed by the polarizers as described above by applying the present technology.

Figure 10:
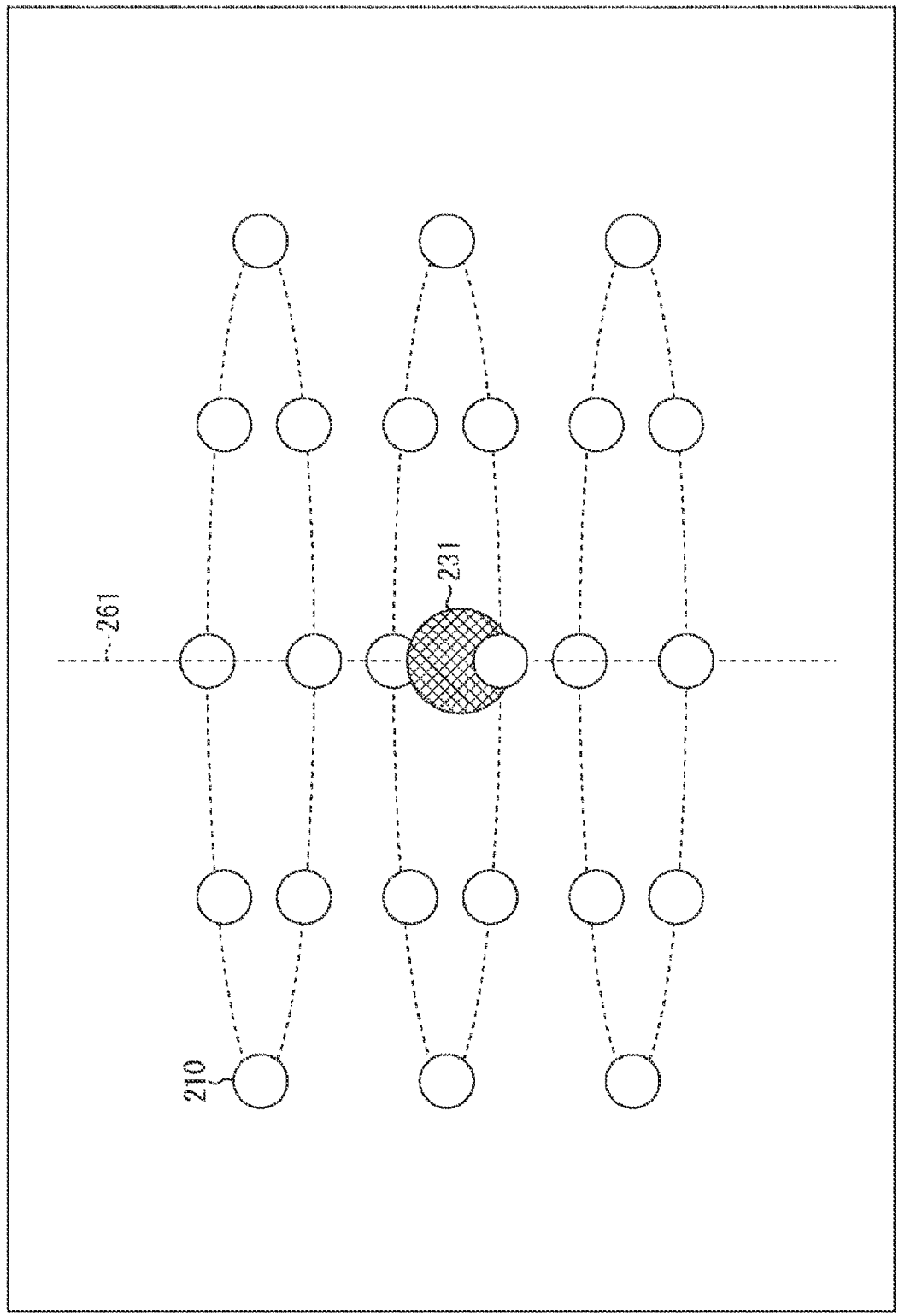
FIG. 10 is a diagram illustrating an arrangement example of the imaging and illumination unit.

For example, as illustrated in FIG. 10, the plurality of imaging and illumination units 210 the imaging units 131 and the illumination units 132) may be arranged in a cylindrical shape with a vertical line 261 passing through the object 231 as a central axis. Even in such a case, the occurrence of what is called flare, ghost, halation, and the like can be suppressed by the polarizers as described above by applying the present technology.

Figure 11:
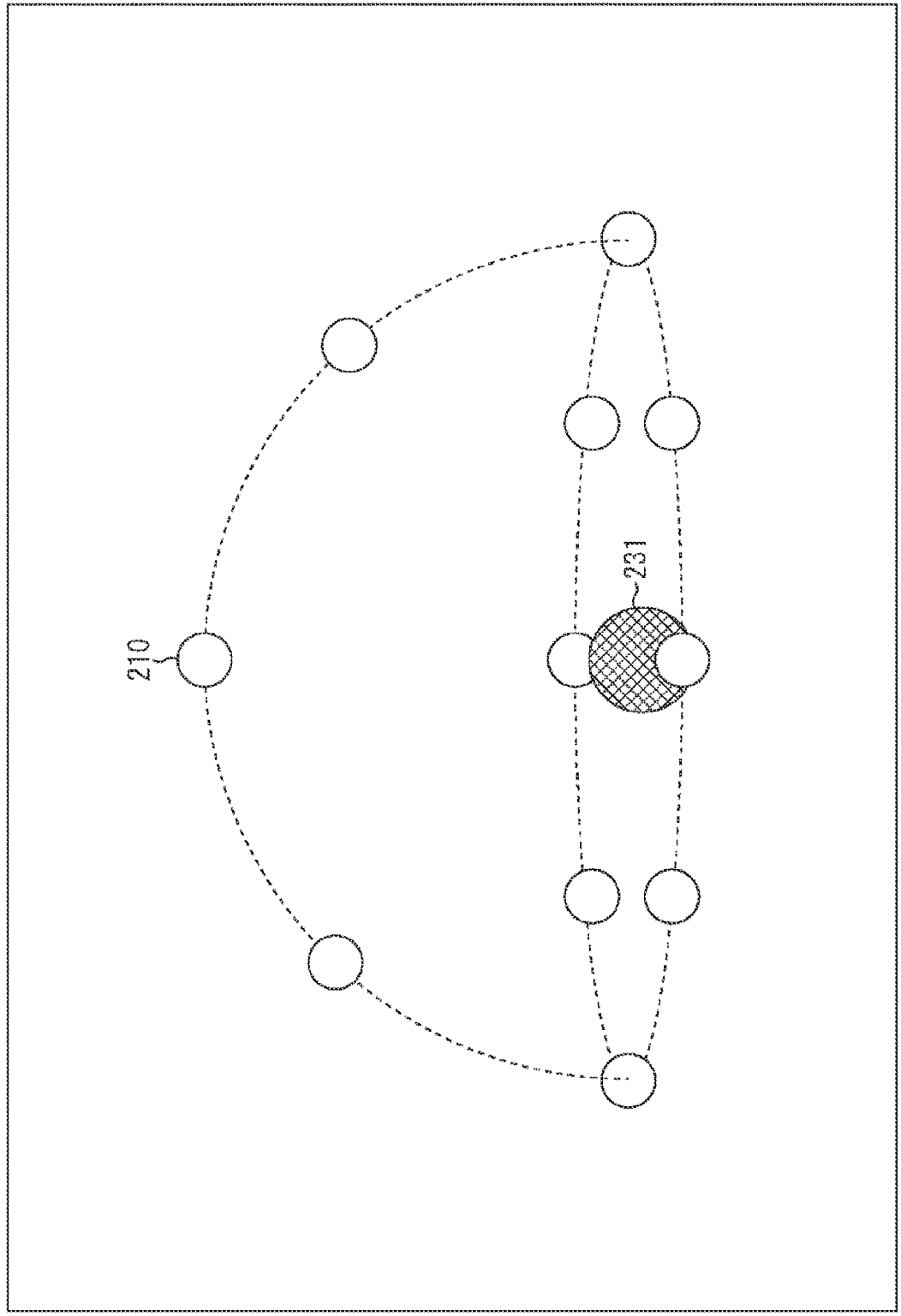
FIG. 11 is a diagram illustrating an arrangement example of the imaging and illumination unit.

For example, as illustrated in FIG. 11, the plurality of imaging and illumination units 210 (the imaging units 131 and the illumination units 132) may be arranged in a spherical (or hemispherical) shape centered on the object 231. Even in such a case, the occurrence of what is called flare, ghost, halation, and the like can be suppressed by the polarizers as described above by applying the present technology.

<Extraction of Silhouette>

Figure 12:
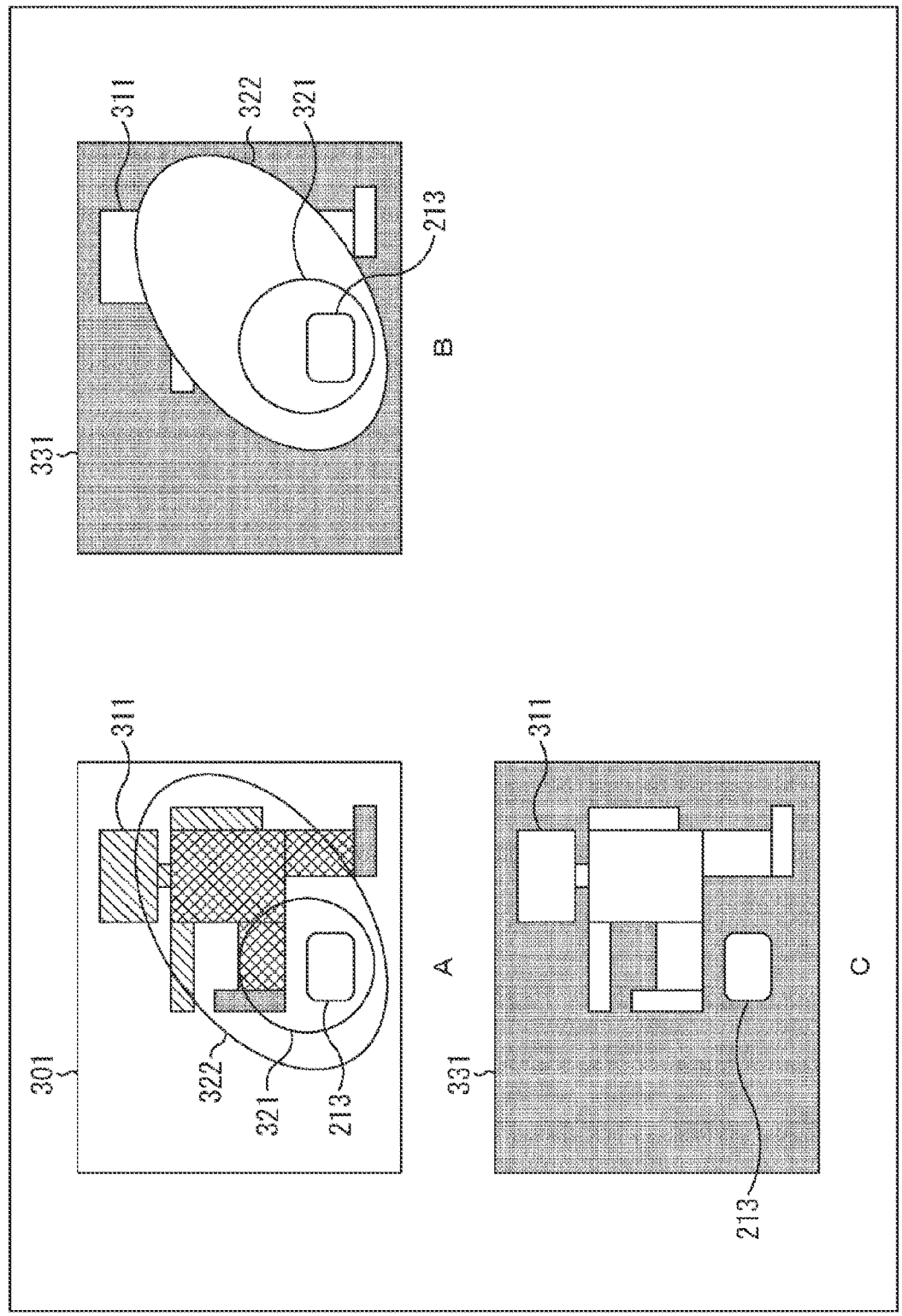
FIG. 12 is a diagram illustrating an example of a captured image.

For example, as illustrated in A of FIG. 12, in a captured image 301 generated by the RGB camera 211, an object 311 as a subject and an IR light 213 of another imaging and illumination unit 210 appear together (are included within the angle of view). In this case, since the captured image 301 is a captured image in the wavelength region of visible light flare as indicated by an ellipse 321 or an ellipse 322 due to direct light (infrared light) from the IR light 213 does not occur.

On the other hand, the IR camera 212 generates a captured image 331 of the wavelength region of infrared light as illustrated in B of FIG. 12. The angles of view of the RGB camera 211 and the IR camera 212 are substantially the same. Thus, the IR light 213 of another imaging and illumination unit 210 also appears in the captured image 331 (is included within the angle of view). Thus, in a case where the present technology is not applied, in the captured image 331, flare (ellipse 321 or ellipse 322) occurs due to direct light (infrared light) from the IR light 213. Thus, it is difficult to accurately extract the silhouette of the object 311.

By applying the present technology, the IR camera 212 can suppress the direct light from the IR light 213 by the polarizer in a polarization direction different from the polarization direction of the polarizer of the IR light 213, and can generate the captured image 331 as illustrated in C of FIG. 12. That is, it is possible to suppress the occurrence of what is called flare, ghost, halation, and the like. Accordingly, the silhouette can be more accurately extracted from the captured image 331, and thus the 3D model Generation unit 102 can generate a more accurate 3D model (reduction in the accuracy of the 3D model can be suppressed).

2. SECOND EMBODIMENT

<Calibration>

The polarization directions of the polarizers of the imaging unit 131 and the illumination unit 132 may be calibrated (adjusted). As described above, the amount of light suppressed by the polarizer of the imaging unit 131 varies depending on the relative angle between the polarization directions of the polarizers of the imaging unit 131 and the illumination unit 132. That is, the degree of suppression of the occurrence of what is called flare, ghost, halation, and the like changes. Therefore, for example, the polarization direction of each polarizer may be calibrated so that the relative angle becomes an appropriate angle (occurrence of what is called flare, ghost, halation, and the like can be further suppressed) according to the position or attitude in which the imaging unit 131 or the illumination unit 132 is installed.

<Data Acquisition Unit>

Figure 13:
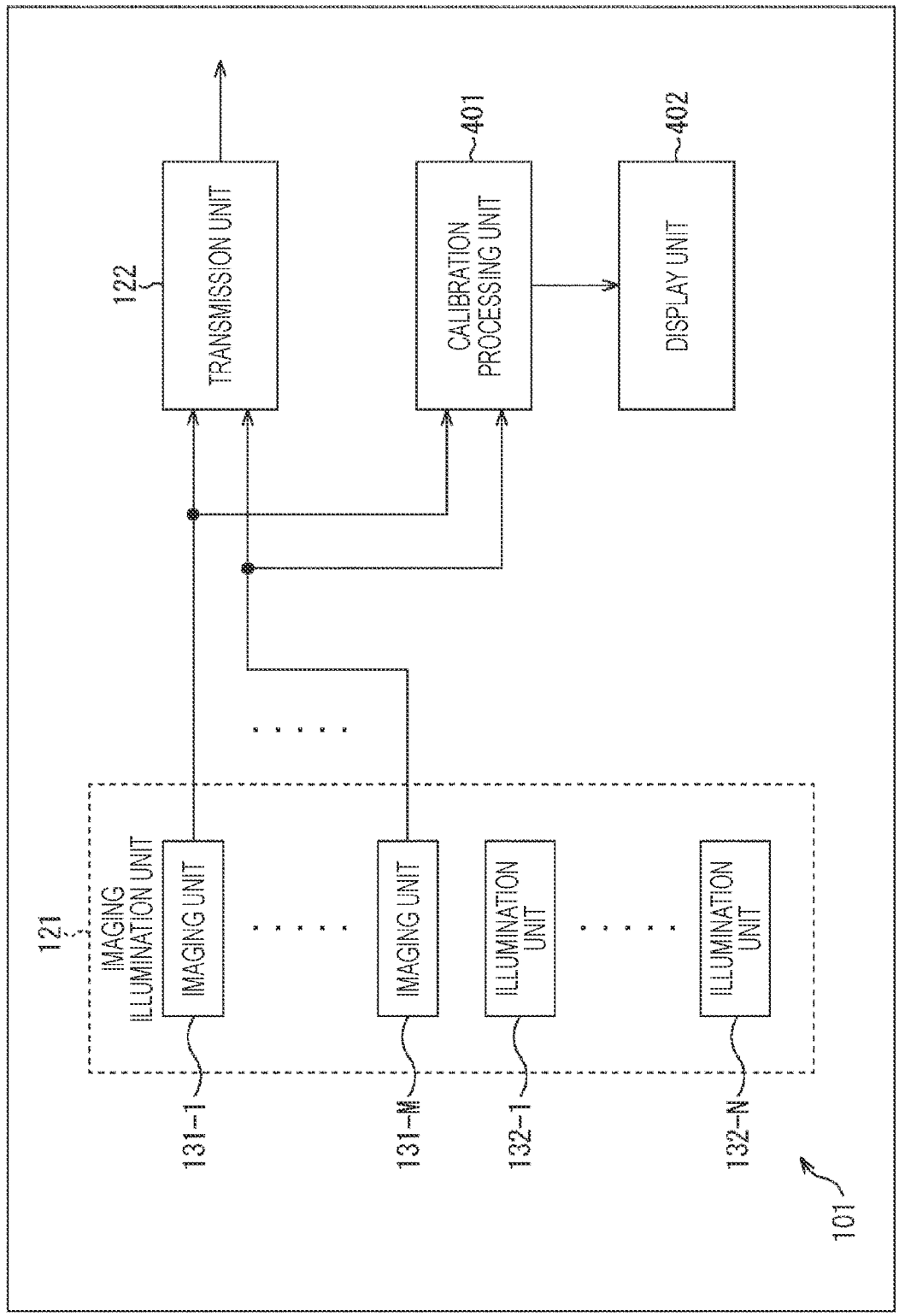
FIG. 13 is a block diagram illustrating another configuration example of the data acquisition unit.

FIG. 13 is a block diagram illustrating a main configuration example of the data acquisition unit 101 in that case. As illustrated in FIG. 13, the data acquisition unit 101 includes a calibration processing unit 401 and a display unit 402 in addition to the configuration of FIG. 3.

The calibration processing unit 401 is an example of a calibration device that calibrates the polarization direction of the polarizing filter, acquires a captured image generated by the imaging unit 131, and derives a more suitable polarization direction (polarization direction capable of further suppressing occurrence of what is called flare, ghost, halation, and the like) on the basis of the captured image. Furthermore, the calibration processing unit 401 generates a display image indicating the derived polarization direction and supplies the display image to the display unit 402.

The display unit 402 displays the display image supplied from the calibration processing unit 401. The user refers to the display image displayed on the display unit 402 to grasp the polarization direction in which the occurrence of what is called flare, ghost, halation, and the like can be further suppressed. The polarization directions of the polarizers of the imaging unit 131 and the illumination unit 132 are variable, and the imaging unit 131 and the illumination unit 132 have a polarization direction control mechanism (movable ring or the like) that controls the polarization direction of the polarizer. The user operates the polarization direction control mechanism to calibrate the polarization direction to a desired direction.

<Flow of Calibration Processing>

Figure 14:
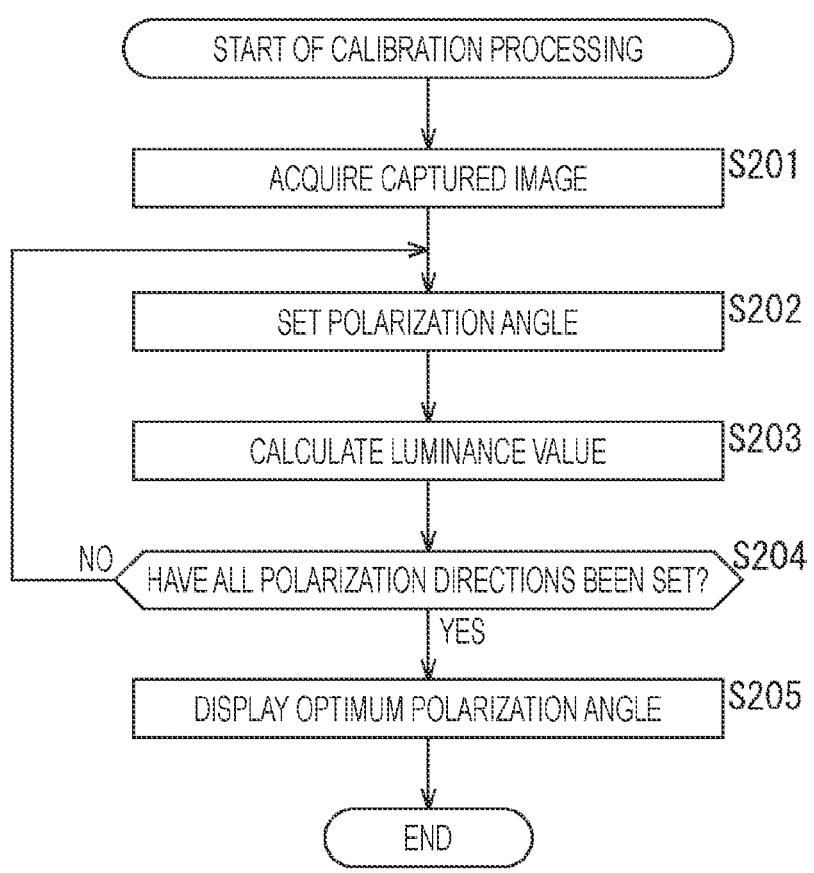
FIG. 14 is a flowchart describing an example of a flow of calibration processing.

An example of flow of the calibration processing executed by such a calibration processing unit 401 will be described with reference to a flowchart of FIG. 14. When the calibration processing is started, the calibration processing unit 401 acquires a captured image in step S201.

In step S202, the user sets the polarization direction (polarization angle) of the polarizers of the imaging unit 131 and the illumination unit 132 to a predetermined direction (angle) different from the previous direction.

In step S203, the calibration processing unit 401 calculates a luminance value of the acquired captured image.

In step S204, the calibration processing unit 401 determines whether or not the polarization direction (polarization angle) has been set to all possible directions (angles). That is, the calibration processing unit 401 acquires the captured image in all the possible polarization directions (polarization angles) and determines whether or not the luminance value has been calculated.

In a case where it is determined that there is an unprocessed direction (angle), the processing returns to step S202. That is, imaging is performed in a new polarization direction (polarization angle), and a luminance value of the captured image is calculated. As described above, in a case where it is determined that the processing has been performed for all the possible directions (angles), the processing proceeds to step S205.

In step S205, the calibration processing unit 401 determines a polarization direction (polarization angle) in which the luminance value is minimized from among the polarization directions (polarization angles) in which the luminance value of the captured image is calculated, and generates a display image indicating the polarization direction (polarization angle). The display unit 402 displays the display image.

Thus, the user can calibrate the polarization directions of the polarizers of the imaging unit 131 and the illumination unit 132 to more appropriate directions on the basis of the display. Therefore, it is possible to further suppress the occurrence of what is called flare, ghost, halation, and the like.

Note that a polarization direction control unit (actuator) that updates the polarization directions of the polarizers of the imaging unit 131 and the illumination unit 132 to the polarization directions derived by the calibration processing unit 401 may be provided.

3. APPLICATION EXAMPLE

Note that a device that detects the inclination of the camera by camera calibration may be further included. The position of the calibrated camera is expressed in rotation and translation with respect to a certain origin. Furthermore, a device that changes the angle of the polarizing in a case where the rotation of the camera is detected may be provided.

Furthermore, in a case where a polarization sensor is used as the imaging unit 131 as is the example of B of FIG. 5, a sensor that images a plurality of deflection directions (for example, four directions of 0°, 90°, 180°, and 270°, and the like) may be used. For example, rotation information of an automatically controlled light source may be acquired, and the polarization sensor may select a pixel in an optimum polarization direction on the basis of the opening information and generate a captured image corresponding to polarized light in the polarization direction.

Furthermore, a device that controls a deflection angle of the light source according to the camera position may be provided. For example, in a case where an imaging unit such as a drone or a crane camera whose imaging position can be changed is introduced into the surrounding Volumetric imaging environment, there is a possibility that the light enters the opposite position due to the movement. Accordingly, the polarization direction. (polarization angle) on the light side may be controlled using the position and rotation information of the camera.

4. APPENDIX

Application Example of Present Technology

The technology according to the present disclosure can be applied to various products and services.

1. Production of Content

For example, new video content may be produced by combining the 3D model of the subject Generated in the present embodiment with 3D data managed by another server. Furthermore, for example, in a case where there is background data acquired by an imaging device such as Lidar, content as if the subject is at a place indicated by the background data can be produced by combining the 3D model of the subject generated in the present embodiment and the background data. Note that the video content may be three-dimensional video content or two-dimensional video content converted into two dimensions. Note that examples of the 3D model of the subject generated in the present embodiment include a 3D model generated by the 3D model generation unit and a 3D model reconstructed by the rendering unit, and the like.

2. Experience in Virtual Space

For example, the subject (for example, a performer) generated in the present embodiment can be arranged in a virtual space that is a place where the user communicates as an avatar. In this case, the user has an avatar and can view a subject of a live image in the virtual space.

3. Application to Communication with Remote Location

For example, by transmitting the 3D model of the subject generated by the 3D model generation unit 102 from the transmission unit 104 to a remote location, a user at the remote location can view the 3D model of the subject through a reproduction device at the remote location. For example, by transmitting the 3D model of the subject in real time, the subject and the user at the remote location can communicate with each other in real time. For example, a case where the subject is a teacher and the user is a student, or a case where the subject is a physician and the user is a patient can be assumed.

4. Others

For example, a free viewpoint video of a sport or the like can be generated on the basis of the 3D models of the plurality of subjects generated in the present embodiment, or an individual can distribute himself/herself, which is a 3D model generated in the present embodiment, to a distribution platform. As described above, the contents in the embodiments described in the present description can be applied to various technologies and services.

<Computer>

The series of processes described above can be executed by hardware or can be executed by software. In a case where the series of processes is executed by software, a program constituting the software is installed in a computer. Here, the computer includes a computer incorporated in dedicated hardware, a general-purpose personal computer for example that can execute various functions by installing various programs, and the like.

FIG. 15 is a block diagram illustrating a configuration example of hardware of a computer that executes the above-described series of processes by a program.

In a computer 900 illustrated in FIG. 15, a central processing unit (CPU) 901, a read only memory (ROM) 902, and a random access memory (RAM) 903 are interconnected via a bus 904.

An input-output interface 910 is also connected to the bus 904. An input unit 911, an output unit 912, a storage unit 913, a communication unit 914, and a drive 915 are connected to the input-output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a nonvolatile memory, and the like. The communication unit 914 includes, for example, a network interface. The drive 915 drives a removable medium 921 such as a magnetic disk, an optical disk, a magneto-optical disk, or a semiconductor memory.

In the computer configured as described above, the CPU 901 loads, for example, a program stored in the storage unit 913 into the RAM 903 via the input-output interface 910 and the bus 904 and executes the program, so as to perform the above-described series of processes.

The RAM 903 also appropriately stores data and the like necessary for the CPU 901 to execute various processes.

The program executed by the computer can be applied by being recorded in the removable medium 921 as a package medium or the like, for example. In this case, the program can be installed in the storage unit 913 via the input-output interface 910 by attaching the removable medium 921 to the drive 915.

Furthermore, this program can be provided via a wired or wireless transmission medium such as a local area network, the Internet, or digital satellite broadcasting. In this case, the program can be received by the communication unit 914 and installed in the storage unit 913.

In addition, this program can be installed in the ROM 902 or the storage unit 913 in advance.

Applicable Target of the Present Technology

Furthermore, although the information processing system and the like have been described above as application examples of the present technology, the present technology can be applied to any configuration.

For example, the present technology can be applied to various electronic devices such as a transmitter and a receiver (for example, a television receiver and a mobile phone) in satellite broadcasting, cable broadcasting such as cable TV, distribution on the Internet, and distribution to a terminal by cellular communication, or the like, or a device (for example, a hard disk recorder and a camera) that records an image on a medium such as an optical disk, a magnetic disk, and a flash memory, or reproduces an image from the storage medium.

Furthermore, for example, the present technology can also be implemented as a configuration of a part of the device, such as a processor (for example, a video processor) as a system large scale integration (LSI) or the like, a module (for example, a video module) using a plurality of processors or the like, a unit (for example, a video unit) using a plurality of modules or the like, or a set (for example, a video set) obtained by further adding other functions to a unit.

Furthermore, for example, the present technology can also be applied to a network system including a plurality of devices. For example, the present technology may be implemented as cloud computing shared and processed in cooperation by a plurality of devices via a network. For example, the present technology may be implemented in a cloud service that provides a service related to an image (moving image) to any terminal such as a computer, an audio visual (AV) device, a portable information processing terminal, or an Internet of Things (IoT) device.

Note that in the present description, the system means a set of a plurality of components (devices, modules (parts), and the like), and it does not matter whether or not all the components are in the same housing. Therefore, a plurality of devices housed in separate housings and connected via a network, and one device in which a plurality of modules is housed in one housing are all systems.

Field and Application to Which Present Technology is Applicable

Note that the system, device, processing unit, and the like to which the present technology is applied can be used in any fields, for example, traffic, medical care, crime prevention, agriculture, livestock industry, mining, beauty, factory, household appliance, weather, nature monitoring, and the like. Furthermore, its use is arbitrary.

Others

The embodiments of the present technology are not limited to the above-described embodiments, and various modifications are possible without departing from the gist of the present technology.

For example, a configuration described as one device (or processing unit) may be divided and configured as a plurality of devices (or processing units). Conversely, configurations described above as a plurality of devices (or processing units) may be combined and configured as one device (or processing unit). Furthermore, a configuration other than, those described above may of course be added to the configuration of each device (or each processing unit). Moreover, if the configuration and operation of the entire system are substantially the same, a part of the configuration of a certain device (or processing unit) may be included in the configuration of another device (or another processing unit).

Furthermore, for example, the above-described program may be executed in any device. In that case, it is sufficient if the device has necessary functions (functional blocks and the like) and can acquire necessary information.

Furthermore, for example, each step of one flowchart may be executed by one device, or may be shared and executed by a plurality of devices. Moreover, in a case where a plurality of processes is included in one step, the plurality of processes may be executed by one device, or may be shared and executed by a plurality of devices. In other words, a plurality of processes included in one step can be executed as processes of a plurality of steps. Conversely, a process described as a plurality of steps can be collectively executed as one step.

Furthermore, for example, in the program executed by the computer, processes in steps for describing the program may be executed in time series in the order described in the present description, or may be executed in parallel or individually at necessary timing such as when a call is made. That is, as long as no contradiction occurs, the processes in the respective steps may be executed in an order different from the above-described orders. Moreover, the processes in steps for describing this program may be executed in parallel with processes in another program, or may be executed in combination with processes in another program.

Furthermore, for example, a plurality of technologies related to the present technology can be implemented independently as a single body as long as there is no contradiction. Of course, any plurality of the present technologies can also be used and implemented in combination. For example, part or all of the present technologies described in any of the embodiments can be implemented in combination with part or all of the present technologies described in other embodiments. Furthermore, part or all of any of the above-described present technologies can be implemented by using together with another technology that is not described above.

Note that the present technology can have configurations as follows.

(1) An imaging processing system that generates a three-dimensional (3D) model of an object by using a plurality of captured images obtained by imaging the object, the imaging processing system including:
a plurality of polarization illumination devices that includes a polarizer and irradiates the object with polarized light obtained by transmitting light emitted from a light emitting unit through the polarizer from positions different from each other; and
a plurality of polarization imaging devices that includes a polarizer and generates the captured images by using polarized light obtained by transmitting light from outside through the polarizer at positions different from each other where the object and at least one of the polarization illumination devices are within an angle of view, in which
a polarization direction of the polarizer of the polarization imaging device is different from a polarization direction of the polarizer of the polarization illumination device.

(2) The imaging processing system according to (1), in which
another polarization imaging device among the plurality of the polarization imaging devices is located within the angle of view of the polarization imaging device.

(3) The imaging processing system according to (2), in which
the another polarization imaging device faces the polarization imaging device.

(4) The imaging processing system according to (3), in which
the polarization illumination device is located close to any one of the polarization imaging devices, and an irradiation direction of the polarized light is same as an imaging direction of the polarization imaging devices.

(5) The imaging processing system according to any one of (1) to (4), in which
the plurality of the polarization illumination devices is located within the angle of view of the polarization imaging device.

(6) The imaging processing system according to any one of (1) to (5), in which
the plurality of the polarization illumination devices includes a first polarization illumination device and a second polarization illumination device,
the plurality of the polarization imaging devices includes a first polarization imaging device at a position where the object and the first polarization illumination device are within an angle of view, and a second polarization imaging device at a position where the object and the second polarization illumination device are within an angle of view,
a polarization direction of a polarizer of the first polarization imaging device is different from a polarization direction of a polarizer of the first polarization illumination device, and
a polarization direction of a polarizer of the second polarization imaging device is different from a polarization direction of a polarizer of the second polarization illumination device.

(7) The imaging processing system according to (6), in which
the polarization direction of the polarizer of the first polarization illumination device is different from the polarization direction of the polarizer of the second polarization illumination device.

(8) The imaging processing system according to any one of (1) to (7), in which
the plurality of the polarization imaging devices and the plurality of the polarization illumination devices are arranged so as to surround the object.

(9) The imaging processing system according to (8), in which
the plurality of the polarization imaging devices and the plurality of the polarization illumination devices are arranged in a circular shape centered on the object.

(10) The imaging processing system according to (8), in which
the plurality of the polarization imaging devices and the plurality of the polarization illumination devices are arranged in a columnar shape with a vertical line passing through a position of the object as a central axis.

(11) The imaging processing system according to (8), in which
the plurality of the polarization imaging devices and the plurality of the polarization illumination devices are arranged in a spherical shape with the object as a center.

(12) The imaging processing system according to any one of (1) to (11), in which
the polarization imaging devices generate a captured image for extracting a silhouette of the object.

(13) The imaging processing system according to any one of (1) to (12), further including
an imaging device that images the object and generates a captured image for extracting a texture of the object.

(14) The imaging processing system according to any one of (1) to (13), in which
the polarization illumination devices emit the polarized light of visible light, and
the polarization imaging devices generate the captured image by using the polarization of visible light.

(15) The imaging processing system according to any one of (1) to (13), in which
the polarization illumination devices emit the polarized light of invisible light, and
the polarization imaging devices generate the captured image by using the polarization of invisible light.

(16) The imaging processing system according to any one of (1) to (15), in which
the polarizer is a polarizing filter,

(17) The imaging processing system according to (16), in which
a polarization direction of the polarizing filter is variable, and
the polarization imaging device further includes a polarization direction control mechanism that controls the polarization direction of the polarization filter.

(18) The imaging processing system according to (17), further including
a calibration device that calibrates a polarization direction of the polarizing filter.

(19) A three-dimensional (3D) model generation method, including:
generating a captured image of an object by using polarized light in a polarization direction different from a polarization direction of polarized light emitted from a polarization illumination device within an angle of view at positions different from each other; and
generating a 3D model of the object by using a plurality of the captured images obtained at the positions different from each other.

(20) An imaging processing system, including:
a plurality of polarization illumination devices that includes a polarizer and irradiates an object with polarized light obtained by transmitting light emitted from a light emitting unit through the polarizer from positions different from each other; and
a plurality of polarization imaging devices that includes a polarizer and generates a captured image of the object by using polarized light obtained by transmitting light from outside through the polarizer at positions different from each other where the object and at least one of the polarization illumination devices are within an angle of view), in which
a polarization direction of the polarizer of the polarization imaging device is different from a polarization direction of the polarizer of the polarization illumination device.

REFERENCE SIGNS LIST

100 Information processing system
101 Data acquisition unit
102 3D model generation unit
103 Formatting unit
104 Transmission unit
105 Reception unit
106 Rendering unit
107 Display unit
121 Imaging illumination unit
122 Transmission unit
131 Imaging unit
132 Illumination unit
151 Polarizing filter
152 Light emitting unit
171 Polarizing filter
172 Image sensor
191 Polarization sensor 210 Imaging and illumination unit
211 RGB camera
212 IR camera
213 IR light
231 Object
401 Calibration processing unit
402 Display unit

The invention claimed is:

1. An imaging processing system configured to generate a three-dimensional (3D) model of an object by using a plurality of captured images obtained by imaging the object, the imaging processing system comprising:
a plurality of polarization illumination devices provided at positions different from each other, wherein each polarization illumination device includes a respective polarizer and is configured to irradiate the object with polarized light obtained by transmitting light emitted from a light emitting unit through the respective polarizer; and
a plurality of polarization imaging devices provided at positions different from each other, wherein each polarization imaging device includes a respective polarizer and is configured to generate one or more of the plurality of captured images by using polarized light obtained by receiving light from outside through the respective polarizer,
wherein the object and at least one respective polarization illumination device of the plurality of polarization illumination devices are within an angle of view of each respective polarization imaging device, and
wherein a polarization direction of the respective polarizer of each respective polarization imaging device is different from a polarization direction of the respective polarizer of each respective polarization illumination device within the angle of view of the respective polarization imaging device.

2. The imaging processing system according to claim 1, wherein another polarization imaging device among the plurality of the polarization imaging devices is located within the angle of view of each respective polarization imaging device.

3. The imaging processing system according to claim 2, wherein the another polarization imaging device faces the respective polarization imaging device.

4. The imaging processing system according to claim 3, wherein each polarization illumination device is located close to one or more of the plurality of polarization imaging devices, and
wherein an irradiation direction of the polarized light emitted from each polarization illumination device is same as an imaging direction of the one or more of the plurality of polarization imaging devices.

5. The imaging processing system according to claim 1, wherein the plurality of the polarization illumination devices is located within the angle of view of each polarization imaging device.

6. The imaging processing system according to claim 1, wherein the plurality of the polarization illumination devices includes
a first polarization illumination device, and
a second polarization illumination device,
wherein the plurality of the polarization imaging devices includes
a first polarization imaging device at a position where the object and the first polarization illumination device are within an angle of view, and
a second polarization imaging device at a position where the object and the second polarization illumination device are within an angle of view,
wherein a polarization direction of a respective polarizer of the first polarization imaging device is different from a polarization direction of a respective polarizer of the first polarization illumination device, and
wherein a polarization direction of a respective polarizer of the second polarization imaging device is different from a polarization direction of a respective polarizer of the second polarization illumination device.

7. The imaging processing system according to claim 6, wherein the polarization direction of the respective polarizer of the first polarization illumination device is different from the polarization direction of the respective polarizer of the second polarization illumination device.

8. The imaging processing system according to claim 1, wherein the plurality of the polarization imaging devices and the plurality of the polarization illumination devices are configured to be arranged so as to surround the object.

9. The imaging processing system according to claim 8, wherein the plurality of the polarization imaging devices and the plurality of the polarization illumination devices are configured to be arranged in a circular shape centered on the object.

10. The imaging processing system according to claim 8, wherein the plurality of the polarization imaging devices and the plurality of the polarization illumination devices are configured to be arranged in a columnar shape with a vertical line passing through a position of the object as a central axis.

11. The imaging processing system according to claim 8, wherein the plurality of the polarization imaging devices and the plurality of the polarization illumination devices are configured to be arranged in a spherical shape with the object as a center.

12. The imaging processing system according to claim 1, wherein the plurality of polarization imaging devices are configured to generate a captured image for extracting a silhouette of the object.

13. The imaging processing system according to claim 1, further comprising:
an imaging device configured to
image the object, and
generate a captured image for extracting a texture of the object.

14. The imaging processing system according to claim 1, wherein the plurality of polarization illumination devices emit the polarized light of visible light, and
wherein the plurality of polarization imaging devices generate each captured image by using the polarized light of visible light.

15. The imaging processing system according to claim 1, wherein the plurality of polarization illumination devices emit the polarized light of invisible light, and
wherein the plurality of polarization imaging devices generate each captured image by using the polarized light of invisible light.

16. The imaging processing system according to claim 1, wherein each respective polarizer includes a polarizing filter.

17. The imaging processing system according to claim 16, wherein a respective polarization direction of the polarizing filter of each respective polarizer is variable, and wherein each polarization imaging device further includes a polarization direction control mechanism configured to control the polarization direction of the polarization filter.

18. The imaging processing system according to claim 17, further comprising:
a calibration device including circuitry configured to calibrate a polarization direction of the polarizing filter.

19. A three-dimensional (3D) model generation method, comprising:
generating a captured image of an object by using polarized light in a polarization direction different from a polarization direction of polarized light emitted from at least one polarization illumination device within an angle of view of each polarization imaging device among a plurality of polarization imaging devices provided at positions different from each other; and
generating a 3D model of the object by using a plurality of captured images obtained from the plurality of polarization imaging devices provided at the positions different from each other,
wherein a polarization direction of a respective polarizer of each respective polarization imaging device is different from a polarization direction of a respective polarizer of each respective polarization illumination device within the angel of view of the respective polarization imaging device.

20. An imaging processing system, comprising:
a plurality of polarization illumination devices provided at positions different from each other, wherein each polarization illumination device includes a respective polarizer and is configured to irradiate an object with polarized light obtained by transmitting light emitted from a light emitting unit through the respective polarizer; and
a plurality of polarization imaging devices provided at positions different from each other, wherein each polarization imaging device includes a respective polarizer and is configured to generate a captured image of the object by using polarized light obtained by receiving light from outside through the respective polarizer,
wherein the object and at least one respective polarization illumination device of the plurality of polarization illumination devices are within an angle of view of each respective polarization imaging device, and
wherein a polarization direction of the respective polarizer of each respective polarization imaging device is different from a polarization direction of the respective polarizer of each respective polarization illumination device within the angle of view of the respective polarization imaging device.

* * * * *